United States Patent
Pitt et al.

(10) Patent No.: US 8,063,132 B2
(45) Date of Patent: *Nov. 22, 2011

(54) COATING COMPOSITION COMPRISING BOEHMITE PARTICLES AND ONE OR MORE DISPERSANTS AND A METHOD OF COATING A SUBSTRATE USING SAID COATING COMPOSITION

(75) Inventors: Alan R. Pitt, Sandridge (GB); Trevor J. Wear, Harrow (GB); John H. Hone, Chalfont St. Peter (GB); Andrew M. Howe, Watford (GB)

(73) Assignee: Eastman Kodak Company, Rochester, NY (US)

( * ) Notice: Subject to any disclaimer, the term of this patent is extended or adjusted under 35 U.S.C. 154(b) by 997 days.

This patent is subject to a terminal disclaimer.

(21) Appl. No.: 11/722,666

(22) PCT Filed: Dec. 22, 2005

(86) PCT No.: PCT/GB2005/004995
§ 371 (c)(1),
(2), (4) Date: Sep. 19, 2007

(87) PCT Pub. No.: WO2006/067453
PCT Pub. Date: Jun. 29, 2006

(65) Prior Publication Data
US 2008/0090012 A1    Apr. 17, 2008

(30) Foreign Application Priority Data
Dec. 23, 2004   (GB) .................................. 0428260.4

(51) Int. Cl.
*C04B 26/06* (2006.01)
*C08K 3/10* (2006.01)
(52) U.S. Cl. .................... 524/437; 427/372.2; 427/385.5
(58) Field of Classification Search ............... 427/372.2, 427/385.5; 524/437
See application file for complete search history.

(56) References Cited

U.S. PATENT DOCUMENTS

| | | | |
|---|---|---|---|
| 3,117,944 A | 1/1964 | Harrell | |
| 3,935,023 A | 1/1976 | Derolf | |
| 4,946,666 A * | 8/1990 | Brown | .......................... 423/625 |
| 5,550,180 A * | 8/1996 | Elsik et al. | .................... 524/430 |
| 6,171,573 B1 | 1/2001 | Sato | |
| 6,264,710 B1 | 7/2001 | Erickson | |
| 6,476,083 B1 | 11/2002 | Okura et al. | |
| 6,489,382 B1 | 12/2002 | Giesecke et al. | |
| 6,660,793 B1 | 12/2003 | McIntyre et al. | |
| 6,667,142 B2 | 12/2003 | Dorr et al. | |
| 2002/0027304 A1 | 3/2002 | Robson et al. | |
| 2004/0258608 A1 | 12/2004 | Cayton et al. | |

FOREIGN PATENT DOCUMENTS

| EP | 0 736 491 | 8/1998 |
|---|---|---|
| WO | WO 04/000916 | 12/2003 |

OTHER PUBLICATIONS

Saeed Farrokhpay et al; *Surface And Colloid Science*; "Role Of Polymeric Dispersant Functional Groups In The Dispersion Behaviour Of Titania Pigment Particles"; vol. 128; 2004; pp. 216-220.

* cited by examiner

*Primary Examiner* — David W Wu
*Assistant Examiner* — Marie Reddick
(74) *Attorney, Agent, or Firm* — Andrew J. Anderson

(57) ABSTRACT

The invention provides a coating composition containing boehmite particles and a dispersant which comprises a compound having an anchoring moiety linked to a polymeric hydrophilic moiety, the anchoring moiety containing at least one acid and/or hydroxy group and having overall acidity or neutrality and the polymeric moiety having a lower affinity for a boehmite surface than the anchoring moiety. The anchoring moiety preferably contains at least two acid groups, preferably carboxylic acid groups, attached either in a [1,1], [1,2] or [1,3] relationship and is linked to the polymeric moiety, which is preferably derived from acrylamide or methacrylamide monomer units, preferably by a sulfur atom. The dispersant can reduce the viscosity of the boehmite dispersion and the tendency of the boehmite dispersion to increase in viscosity and/or form a gel or a yield stress material following periods of high shear stress.

14 Claims, 3 Drawing Sheets

COATING COMPOSITION COMPRISING BOEHMITE PARTICLES AND ONE OR MORE DISPERSANTS AND A METHOD OF COATING A SUBSTRATE USING SAID COATING COMPOSITION

CROSS REFERENCE TO RELATED APPLICATION

This application is related to copending UK patent application No. 0428262.0, and corresponding U.S. Ser. No. 11/722,674, now US Patent Publication No. 2008/0145546.

FIELD OF THE INVENTION

The invention relates to a dispersant for an aqueous solid dispersion or composition therefrom, in particular of the boehmite form of alumina, which can reduce the viscosity and/or the tendency to increase in viscosity and to form a gel or a yield stress material, especially following a period of high shear stress. The boehmite composition may be used, for example, as a component of a coating material, an inkjet recording paper or film, a chemical-mechanical polishing/abrasive material, a ceramic, a cement, a paint, a catalyst system, a refractory material, a surface-frictionising formulation or a filler or any product that incorporates nanoparticulate materials.

BACKGROUND OF THE INVENTION

Manufacturing formulations involving aqueous solid dispersions often require to be processed at a high concentration of solids to reduce costs of transportation, to increase laydown and to reduce the drying load, as the removal of water is wasteful and expensive. The formulations often also need to be stable over a wide range of shear, which extends from low to high shear rates or stresses. After periods of high shear, aqueous dispersions of boehmite, especially those containing high concentrations of solid, tend to possess either a high viscosity at low shear or a tendency to form a gel or a yield stress material, depending on the rate of decrease from high shear. The high viscosity of the dispersions at low shear affects their dispersability and flowability, making the systems difficult to stir, pump, transport, coat or pour. Gelation is even more of a problem because it is often irreversible and consequently totally unacceptable for manufacturing processes that rely on systems to flow.

Dispersible boehmite alumina powders have traditionally been used in applications such as sol-gel ceramics, catalysis, refractory materials, rheology control and surface-frictionising. Other more recently developed uses include surface coating as well as paint detackyfication.

A composition containing boehmite is particularly useful in the fabrication of coated inkjet media for inkjet printing, insofar as the dry-coated system is both porous and glossy. The porous nature of the media is useful for the rapid drying of the inks after printing to enable earlier customer handling and to minimize the mottle or coalescence defect: the glossy nature is popular with customers who want rich photographic images. Unfortunately gloss and porosity do not often go hand-in-hand and hence formulations such as those containing boehmite that deliver both are relatively rare and very sought after. However the high viscosity at low shear and/or the tendency to form a gel or a yield stress material in practice limits the use of boehmite in such systems.

It is known in the art that an inorganic, organic or polymeric form of an acid may be added to an aqueous slurry of alumina. Thus U.S. Pat. No. 3,935,023 describes the use of hydrochloric acid to form stable dispersions of alumina, whilst EP-A-0 736 491 teaches the use of a viscosity-reducing agent for an alumina sol based on a compound having a carboxyl group or a sulfonic acid group or a compound selected from the group consisting of formamide or acetamide, relating to small non-polymeric molecules. U.S. Pat. No. 6,171,573 discloses a process for producing alumina sols using an inorganic monobasic acid, such as hydrofluoric acid, or a lower aliphatic monobasic acid, such as formic acid, and U.S. Pat. No. 6,476,083 teaches an alumina dispersant comprising a monocarboxylic acid containing at least one nitrogen atom in its molecule.

U.S. Pat. No. 6,264,710 describes the use of monoprotic acids, such as nitric acid, as peptising agents or dispersion aids for producing more stable alumina (preferably boehmite) sols and suggests that multiprotic acids be avoided since they can rapidly gel the dispersion or sol, making it difficult to handle or to mix in additional components. U.S. Patent Application No. 2002/0027304 discloses the use of acetic acid, citric acid or a polyacrylate as a viscosity modifier for alumina-boehmite systems.

There are a number of publications which further teach the use of acids as dispersion stabilizers for alumina suspensions, such as, for example, 'Ceramic Development: Programmne Research at the Swedish Ceramic Institute 1993-1996' and Journal of Ceramic Processing Research, 3 (2002) 10-14 'Suspension Systems for Coagulation Processing' by C. Pagnoux, which discloses the use of a low molecular weight sulfonic acid (TIRON) and a polyacrylic acid (DISPEX N40).

P. C. Hidber et al., Journal of the European Ceramic Society, 17 (1997) 239-249 'Influence of the Dispersant Structure on Properties of Electrostatically Stabilized Aqueous Alumina Suspensions' describes a dispersant based on a hydroxy- and carboxy acid-substituted benzene ring whilst A. U. Khan et al., J. Mater. Chem., 12 (2002) 1743-1747 'The Strength of Colloidal Interactions in the Presence of Ceramic Dispersants and Binders' discusses the use of the ammonium salt of aurintricarboxylic acid (ALUMINON) as a dispersant of alumina dispersions. The use of citric acid as an alumina dispersant is disclosed in A. R. Studart et al., Journal of the European Ceramic Society, 23 (2003) 997-1004 'Selection of Dispersants for High-Alumina Zero-Cement Refractory Castables' and also in P. C. Hidber et al., J. Am. Ceram. Soc., 79[7] (1996) 1857-67 'Citric Acid—A Dispersant for Aqueous Alumina Suspensions'.

In addition to the use of an acid as an alumina dispersant, the use of an acrylamide polymer for flocculating boehmite is disclosed in U.S. Pat. No. 3,117,944.

PROBLEM TO BE SOLVED BY THE INVENTION

There is a need for a dispersant additive for an aqueous dispersion of alumina particles, specifically of boehmite, especially at high concentrations of solids, that can reduce viscosity and the tendency to increase viscosity and to gel or to form a yield stress material following a period of high shear stress, thereby facilitating handling and processing of a resulting composition. Although it is known that acids can be used to reduce the viscosity of alumina dispersions, their ability to accomplish this is limited after high shear stress. Furthermore, such acids do not prevent the tendency of alumina dispersion systems to gel or to form a yield stress material following such high shear stress. There is also a need to provide a boehmite formulation for an inkjet media that has stability over a wide range of shear and can retain satisfactory gloss and porosity.

SUMMARY OF THE INVENTION

The present invention thus provides a dispersant for an aqueous dispersion of boehmite particles, the dispersant comprising a compound having an anchoring moiety linked to a polymeric hydrophilic moiety, the anchoring moiety containing at least one acid and/or hydroxy group and having an overall acidity or neutrality and the polymeric moiety having a lower affinity for a boehmite surface than the anchoring moiety.

In another aspect there is provided a coating composition containing boehmite particles, the composition comprising one or more dispersants, as hereinbefore defined, in association with an aqueous dispersing medium and optionally a binder.

In yet another aspect there is provided a method of coating a substrate comprising the steps of
 (a) providing a composition of boehmite particles;
 (b) combining the composition with one or more dispersants, as hereinbefore defined, in association with an aqueous dispersing medium, and optionally a binder, to form a coating composition;
 (c) applying the coating composition to the substrate to form a coating thereon: and
 (d) drying the resultant coating.

In a further aspect there is also provided a method of reducing the viscosity and tendency to form a gel or a yield stress material of a dispersion of boehmite particles which comprises the addition thereto of one or more dispersants, as hereinbefore defined, in association with an aqueous dispersing medium and optionally a binder.

In yet a further aspect there is provided the use of a dispersion for the reduction of viscosity and tendency to form a gel or a yield stress material of a dispersion of boehmite particles, and in particular for the preparation of an inkjet recording element to provide stability over a wide range of shear stress whilst retaining satisfactory gloss and porosity, the dispersion comprising one or more dispersants as hereinbefore described in association with an aqueous dispersing medium and optionally a binder.

In an additional aspect there is provided an inkjet recording element comprising a support having thereon at least one image-receiving layer, said inkjet recording element containing a coating composition as hereinbefore defined.

ADVANTAGEOUS EFFECT OF THE INVENTION

The present invention provides an efficient dispersant for an aqueous dispersion of the boehmite form of alumina that can reduce its viscosity and the tendency to increase in viscosity and to form a gel or a yield stress material, particularly after periods of high shear. The dispersant enables the manipulation of the resulting composition, such as stirring, pumping, transporting, coating or pouring even at high concentrations of boehmite, due to its improved dispersability and flowability.

BRIEF DESCRIPTION OF THE DRAWINGS

FIG. 3. shows the gloss of coatings on inkjet media as a function of concentration of dispersant of the invention I-1a.

FIG. 4 shows the porosity of coatings on inkjet media as a function of concentration of dispersant of the invention I-1a.

DETAILED DESCRIPTION OF THE INVENTION

Aqueous dispersions of the boehmite form of alumina at high concentration of solids tend to exhibit relatively high viscosity at low shear stress (of the order of 0.1 Pa or less) and show a tendency to form a gel or a yield stress material following periods of high shear stress (e.g. >100 Pa). Which of these undesirable tendencies prevails depends on the rate of relaxation from high shear conditions, but these tendencies render the compositions resulting from such dispersions of limited use or unacceptable for use in manufacturing processes therefor.

The object of this invention is to provide a water-soluble dispersant that can reduce the tendency of such a dispersion to form a gel or a yield stress material and/or reduce the viscosity of the dispersion at low shear stress, thereby increasing the utility of the dispersion for use in manufacturing processes, relative to other dispersant materials described in the prior art.

As used herein, 'yield stress' is defined as a critical shear stress value below which a plastic or viscoplastic material behaves like a solid (i.e. will not flow). As used herein the term 'yield stress material' is defined as a material that exhibits a 'yield stress'. In many cases this will be a gel but the term is not to be construed as limited thereto, as it may, for example, be a another solid form, such as a paste or 'cake'.

Once the yield stress is exceeded, a plastic material yields while a viscoplastic material flows like a liquid. This problem can manifest itself easily in any manufacturing process utilizing such a dispersion.

Figure 1:
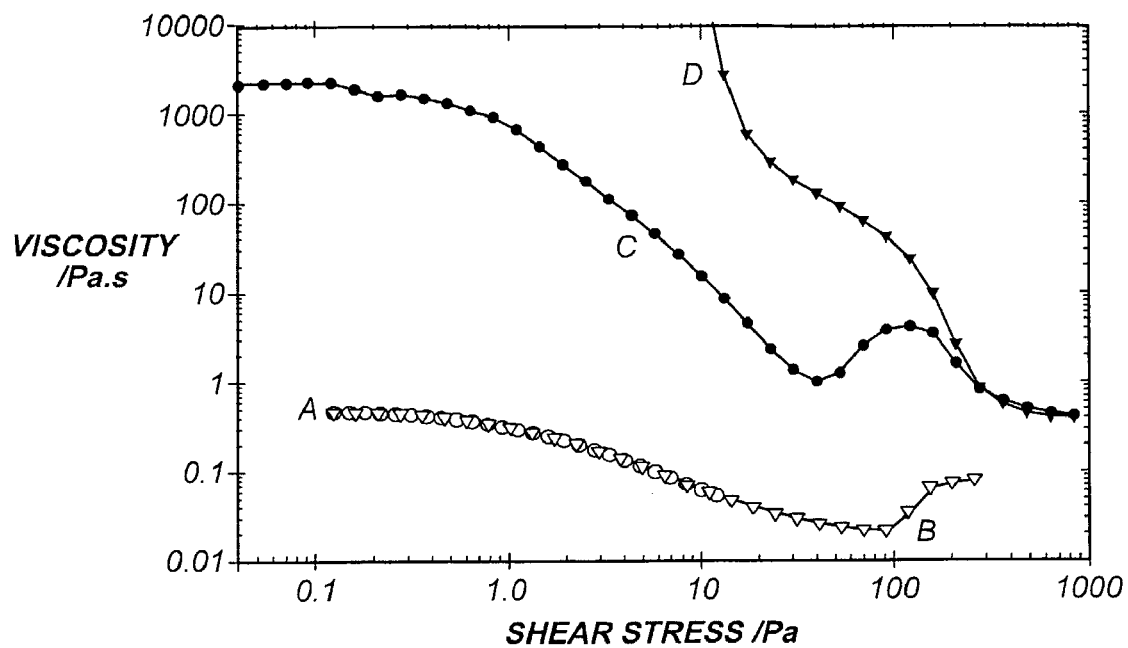
FIG. 1 shows the flow curves A, B, C and D of viscosity v. shear stress (both scaled logarithmically) for the 'Control' of Catapal™ 200+PVA binder in water, in the absence of dispersant.

The Curves A, B, C and D in FIG. 1 are derived from rheological data dependent on the shear stress history of a boehmite dispersion in the absence of dispersant, as explained in more detail hereinafter. If the dispersion is maintained under low to intermediate shear stress (say <10-12 Pa), the system maintains a low viscosity with varying shear stress and is defined as being in its "U1" state (Curve A—open circles). If the U1 state is sheared to much higher levels of shear stress, it goes through a shear-thickening transition, as shown in Curve B (open triangles), after which its state changes irreversibly and the system does not return to its U1 state. However its subsequent behaviour following this transition depends on the rate of decrease in shear stress.

If the application of high shear stress is stopped suddenly, the system changes to a new state—defined as the "T1" state—which exhibits a much higher viscosity at low shear than that of the U1 state, as shown in Curve C. However, if the application of high shear stress is decreased in a steady controlled manner after passing through the shear thickening transition, the viscosity of the system climbs steeply until the system eventually gels, i.e. it has become a gelling yield stress material and has reached the "T2" state, as shown in Curve D.

The T2 state can be shear-thinned dramatically with increasing shear stress but if the shear stress is stopped abruptly as these values of shear stress approach about 1000

Pa, its behaviour returns to that of the "T1" state. However, if the shear is reduced gradually, as before, the system gels again.

Thus an aqueous composition containing a dispersion of boehmite, particularly one with a high solids content, is unacceptable for use in manufacturing processes that experience high shear stress, due to the relatively high viscosity of the T1 state and the gelling nature of the T2 state.

In accordance with the invention therefore the dispersant for use therein aims to
(a) reduce the viscosity (at low shear stress) of the T2 state and the tendency of the T2 state to form a yield stress material or a gel, and/or
(b) reduce the viscosity (at low shear stress) of the T1 state.

The dispersant for use in the invention comprises a compound having an anchoring moiety linked to a polymeric hydrophilic moiety, the anchoring moiety containing at least one acid and/or hydroxy group and having an overall acidity or neutrality and the polymeric moiety having a lower affinity for a boehmite surface than the anchoring moiety.

The acid group is preferably selected from a carboxylic acid, sulfonic acid or phosphoric acid, preferably a sulfonic acid or more preferably a carboxylic acid group. The polymeric hydrophilic moiety is preferably polyacrylamide, poly-N,N-di-methylacrylamide, poly-2-acrylamido-2-hydroxymethyl-1,3-propandiol, polymethacrylamide, poly-N-methylacrylamide or poly-N-methylmethacrylamide or a mixture thereof. More preferably the polymeric moiety is polyacrylamide or poly-N,N-dimethylacrylamide.

The polymeric moiety may contain hydrophobic monomers, provided that it remains hydrophilic in character overall and provided that it contains less than 25% hydrophobic groups and preferably less than 12% hydrophobic groups.

In accordance with a preferred embodiment of the invention the dispersant of the invention has the formula (I):—

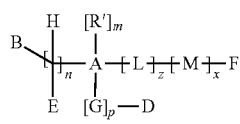

wherein
A is carbon or nitrogen,
R' is hydrogen or an unsubstituted or substituted alkyl, aryl or heterocyclic group and m is 1 when A is carbon and m is 0 when A is nitrogen;
B is an acid group or an ester or amide thereof, or a hydroxy group;
each E is independently hydrogen, an unsubstituted or substituted amino group or an acid group or an ester or amide thereof and n is 0 or an integer from 1 to 10;
D is a hydrogen atom, an unsubstituted or substituted amino group, an acid group or an ester or amide thereof, an unsubstituted or substituted alkyl group or an alkyl group substituted with one or more acid groups or an ester or amide thereof;
G is a carbonyl group or an unsubstituted or substituted alkylene, aminoalkylene or oxyalkylene group and p is 0 or 1;
L is a linking group and z is 0 or 1;
D and L or D, G and L may combine with A to form an unsubstituted or substituted 5-, 6- or 7-membered ring which may include one or more further heteroatoms selected from nitrogen, oxygen and sulfur;

each M is a monomer unit, which may be the same or different, comprising an unsubstituted or substituted acrylamide or methacrylamide, and x is 5-200; and
F is hydrogen or a substituent;
with the proviso that (a) the number of acid groups is equal to or greater than the number of amino groups therein and (b) there is at least one hydroxy or acid group.

Preferably A is carbon and R' is hydrogen or a methyl group. When B, E or D is an acid group, or in the case of D or G substituted with one or more acid groups, the acid is preferably selected from a carboxylic acid, sulfonic acid or phosphoric acid, preferably a sulfonic acid or more preferably a carboxylic acid group.

D is preferably hydrogen or a carboxylic acid group and p is preferably 0. n is generally 0 or 1, but when it is an integer from 2 to 10 each E may be the same or different and is preferably hydrogen or a carboxylic acid group. B may a hydroxy group but is preferably a sulfonic or more preferably a carboxylic acid group. The alkylene group in G may contain an acid group, preferably a carboxylic, sulfonic acid or phosphoric acid group. The more preferred anchoring groups contain at least two acid groups attached either in a [1,1], [1,2] or [1,3] relationship.

L, when present, is preferably a sulfur atom with z=1. However L may also be a chain of up to about 20 atoms that may contain, for example, one or more unsubstituted or substituted alkylene, ester, thioester, amide, thioamide, ketone, thioketone, ether or thioether groups or L may be, for example, a polyalkylenethio group [—(CH$_2$)$_q$—S] group, where q is an integer from 1 to 20 and especially 9, a group —CH$_2$COCH$_2$S or a group —CONH—(CH$_2$)$_r$S, where r is from 1 to 5. z may alternatively be 0 so that there is no linking group present The number of monomer units (x) is preferably 10-100, more preferably 10 to 50. In particular in the case of an acrylamide, the number of units from 25 to 35 has been found to be particularly useful. Within the most preferred range it appears that the reduction in viscosity is particularly effective with increasing polymer length. Preferably the polymer is polyacrylamide, poly-N,N-di-methylacrylamide, poly-2-acrylamido-2-hydroxymethyl-1,3-propandiol, polymethacrylamide, poly-N-methylacrylamide or poly-N-methylmethacrylamide or a mixture thereof. More preferably the polymer is polyacrylamide, poly-N,N-dimethylacrylamide or poly-2-acrylamido-2-hydroxymethyl-1,3-propandiol, but most preferably polyacrylamide.

Thus M may have either of the structures shown below, with the point of attachment to F being on the right hand side:

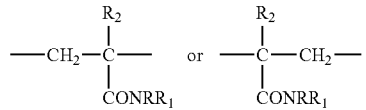

wherein
R, R$_1$ and R$_2$ are independently hydrogen or an unsubstituted or substituted lower alkyl group having 1 to 3 carbon atoms or R$_1$ may be the group C(CH$_2$OH)$_3$. When R, R$_1$ and R$_2$ are each hydrogen, then M is an unsubstituted acrylamide group and this is preferred. However if R and R$_1$ are each independently a methyl, ethyl, n-propyl, i-propyl or t-butyl group (or R$_1$ a C(CH$_2$OH)$_3$ group), then R$_2$ will normally be either hydrogen or a methyl group F is generally hydrogen but may also be a terminal substituent known to one skilled in the art as not having a significant effect on the aqueous solubility of the molecule. It may be, for example, a halogen atom, an unsubstituted or substituted alkyl group, a thiol, a neutral thioether, ether, ester or an alkyl- or aryl-sulfonate group.

The combination of anchor moiety and polymer moiety chemistries is essential for the materials of the invention to function as highly effective dispersants. As will be exemplified hereinafter, if one of the materials of the invention is compared to its two component parts in isolation, for example polyacrylamide and mercaptosuccinic acid, whether the components are each used in isolation or used in an equimolar mixture of the two, the component parts are unable to function as suitable dispersants within the definition and scope of the invention. Indeed the prior art teaches in U.S. Pat. No. 3,117,944 that a polyacrylamide polymer is actually suitable for flocculating boehmite, which is the opposite of the function of the materials of this invention.

Moreover the chemical structures of the anchoring moieties defined in the invention can be important to the function of the materials of the invention as highly effective dispersants. As indicated earlier, the anchor moiety contains one or a small number of hydroxy or acidic groups or a combination of the two, and preferably one or especially two carboxylic acid groups. However amino groups may also be present in the anchoring moiety in combination with an acid group, so long as there is not an excess of amino groups in the anchoring moiety.

The chemical structure of the hydrophilic polymer moiety described in this invention can also be important for the materials of invention to function as highly effective dispersants in aqueous media. As hereinbefore described, the polymeric moiety may contain hydrophobic monomers provided that it remains hydrophilic in character overall. The affinity of the hydrophilic polymer for the surface of the boehmite needs to be less than that of the anchoring moiety, otherwise the polymer is likely to adsorb to the surface of the boehmite with the subsequent potential for bridging between the particles, which is likely to lead to particle aggregation.

Thus as exemplified hereinafter, a hydrophilic polymer with an affinity for an oxide surface, such as polyethyleneoxide (also known as polyethyleneglycol) is unsuitable for the purposes of this invention. When an anchoring moiety of the invention was combined with two different polymer blocks based on polyethyleneglycol methacrylate esters, both systems resulted in yield stress materials when subjected to high shear stress followed by a slow incremental reduction in shear, i.e. the systems tended to gel.

Structures pertaining to formula (I) are illustrated, but not limited to, the following examples (note they are general in terms of the degree of polymerisation x, which is defined above):

I-1
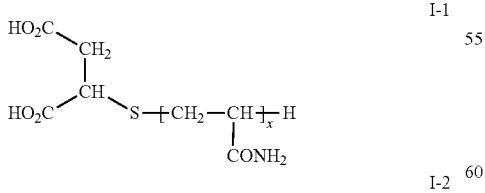

I-2
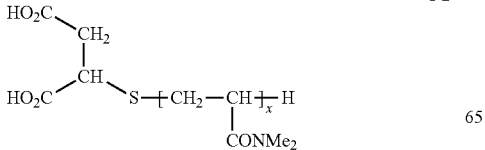

I-3
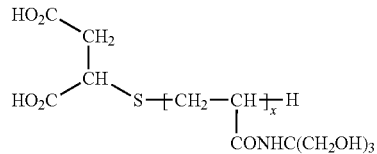

I-4
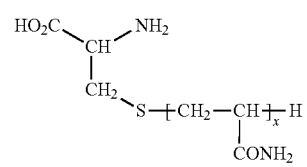

I-5
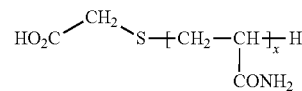

I-6
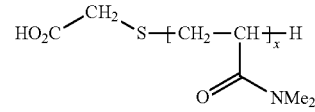

I-7
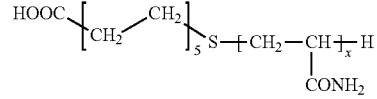

I-8
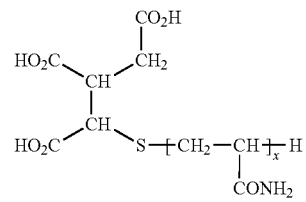

I-9
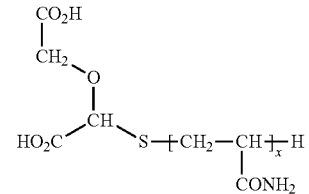

I-10
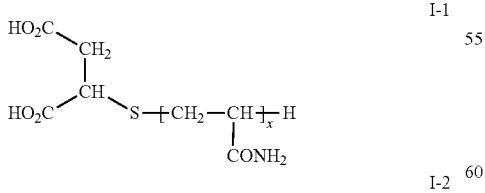

I-11
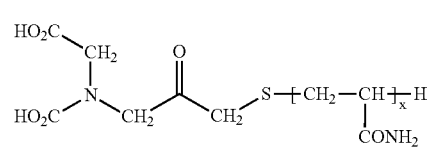

I-13
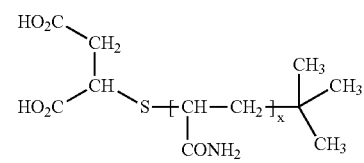
I-13
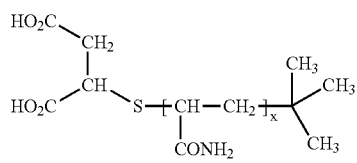
I-12
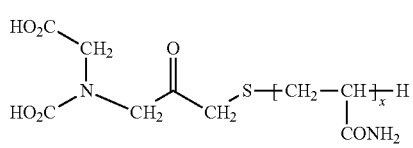
I-13
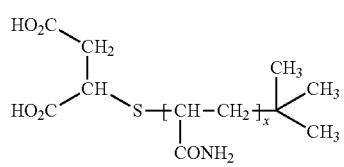
I-14
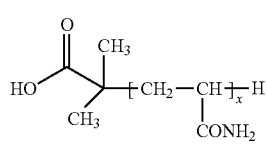
I-15
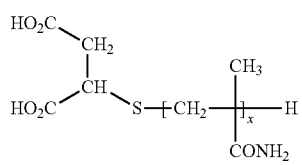
I-16
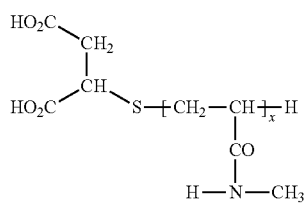
I-17
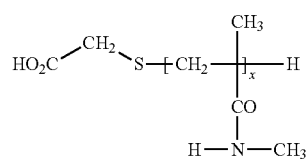
I-18
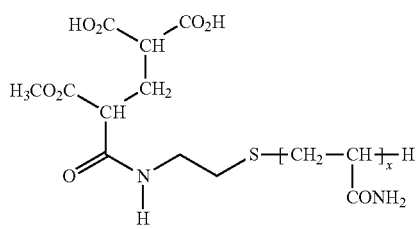
I-19
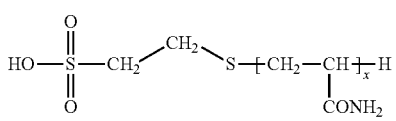
I-20
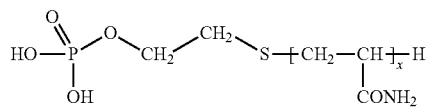
I-21
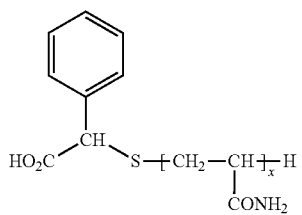
I-21
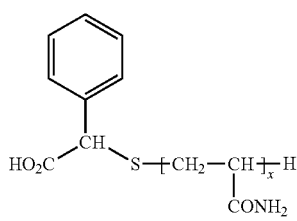
I-22
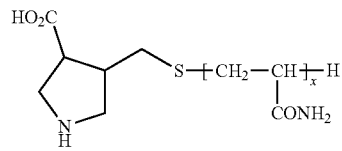
I-23
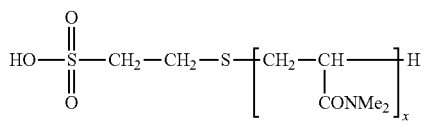
I-24
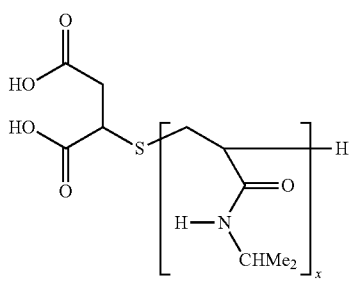
More specific structures of some of the above systems, i.e. where the average degree of polymerisation is defined, are illustrated in the following examples:

| Dispersant | Average Structure (to nearest integer) | $M_n$/ g·mol$^{-1}$ ($M_w$/$M_n$) |
|---|---|---|
| I-1a | | 1210 (1.11) |
| I-1b | | 1630 (2.39) |
| I-1c | | 2060 (1.79) |
| I-2a | | 799 (1.71) |
| I-2b | | 1300 (2.48) |
| I-3a | | 1400 (Not known) |
| I-3b | | 2778 (Not known) |
| I-4a | | 1230 (1.57) |
| I-4b | | 1950 (1.84) |
| I-5a | | 1610 (1.47) |
| I-5b | | 2990 (2.05) |
| I-6a | | 2660 (3.22) |
| I-6b | | 3820 (4.53) |
| I-7a | | 579 (2.09) |

| Dispersant | Average Structure (to nearest integer) | $M_n$/ g·mol$^{-1}$ ($M_w/M_n$) |
|---|---|---|
| I-8a | HO-C(=O)-[CH$_2$]-[CH$_2$-CH$_2$]$_5$-S-[CH$_2$-CH(C(=O)NH$_2$)]$_{24}$-H | 1920 (1.97) |
| I-19a | HO-S(=O)$_2$-CH$_2$-CH$_2$-S-[CH$_2$-CH(CONH$_2$)]$_{30}$-H | 2274 (unknown) |
| I-23a | HO-S(=O)$_2$-CH$_2$-CH$_2$-S-[CH$_2$-CH(CONMe$_2$)]$_8$-H | 922 (1.70) |

A water-dispersible boehmite is typically supplied in powder form consisting of large aggregates, for example about 40 micrometers, of the small primary crystals that were formed during the original synthesis of the boehmite (usually by some form of precipitation). However the crystals are so small they are usually called crystallites: their sizes lie typically in the range 5-80 nanometers. When the powder is dispersed in water using some form of mechanical energy, such as a stirrer, the large aggregates break up into fine aggregates, which tend to lie in the range 20-500 nanometers, depending partly on the crystallite size. The average dispersed particle size in the dispersion of fine aggregates lies typically in the range 25-350 nanometers. Hence even finely dispersed boehmite systems still consist of aggregates of crystallites.

Manufacturers of boehmite usually quote the average crystallite size and the average dispersed particle size for a given composition and set of conditions (e.g. 10 wt % boehmite in 0.4 wt % HNO$_3$). Although this invention is primarily related to the Catapal™ 200 form of alumina, other forms of boehmite can display similar rheological problems to those detailed above. Three boehmite materials are used in examples in this invention for which, the manufacturers (Sasol) quote the following:
1. Catapal™ 200: crystallite size 40 nm; dispersed size=140 nm
2. Disperal™ HP 22: crystallite size=22 nm; dispersed size=230 nm
3. Disperal™ 60: crystallite size=50-60 nm; dispersed particle size=350 nm Thus boehmite particles relating to this invention normally have a crystallite particle size in the range 8-80 nm, more preferably in the range 20-60 nm and most preferably in the range 30-50 nm.

The boehmite composition comprises boehmite particles and an aqueous dispersing medium together with one or more dispersants of the invention and optionally a water-soluble binder and/or a pH modifier. As used herein the term 'dispersion' is generally used to refer more specifically to the solid particulates, aqueous dispersing medium and dispersant, whereas the term 'composition' is generally used to refer to the dispersion together with any added components which may be required, for example, for rendering the dispersion suitable for practical use. The boehmite composition may be prepared using a mechanical mixing device such as, for example, a stirrer, homogeniser, milling device or high-pressure disperser or preferably by using a low shear mixing device.

If a water-soluble binder (or binders) is present it may be any binder known to the skilled person to be suitable for the purpose. Thus it may be a polymer, for example, starch and its modified products, polyvinyl alcohol and its modified products (e.g. acetyl acetylated polyvinyl alcohol), a polyvinyl acetate, hydroxycellulose, hydroxymethyl cellulose, carboxymethyl cellulose, polyvinyl pyrrolidone, polyvinylacetal including its derivatives and protein-derived polymers such as gelatin and its derivatives. It may also be a latex polymer such as, for example, a styrene acrylic latex or styrene butadiene latex. More preferably, it may be polyvinyl pyrrolidone or most preferably a polyvinyl alcohol due to its excellent compatibility with alumina systems, particularly preferred polyvinyl alcohols being those with a degree of hydrolysis of 86-89%, such as Gohsenol™ GH-17, Gohsenol™ GH-20 and Gohsenol™ GH-23, obtainable from Nippon Gohsei, Japan. The amount of binder will vary from application to application, but it is generally present in an amount of from 0 to 40% w/w with respect to the solid particles, more preferably from 0 to 20% w/w, most preferably from 0 to 10% w/w.

A pH modifier could be any suitable organic or inorganic acid, but is preferably a strong acid, such as hydrochloric acid or nitric acid, which may also enhance the efficacy of the reduction in viscosity following high stress conditions.

Optionally, the composition may include other additives such as, for example, fillers or plasticisers, colorants (pigments or dyes), frost inhibitors, hardeners, accelerators, antioxidants, bactericides, antistatic agents, UV absorbers, UV light stabilizers, mordants and materials that limit the adverse effects of atmospheric gases or contaminants. These may be introduced into the composition to produce a more complex boehmite composition, for example, by solubilising (or dispersing) the additives into an aqueous solution (or dispersion) and mixing the resulting solution (or dispersion) of additives with the initial aqueous boehmite dispersion.

The boehmite content in the composition is normally less than or equal to 85 wt %, more preferably 15-55 wt % and most preferably 30-45 wt %. This content permits the particles to be effectively dispersed with the dispersants of the invention and the final composition to be eminently processable due to its improved dispersability and flowability. The dispersant content in the composition is typically used in the range 1:1000 to 200:1000 w/w boehmite solid, preferably 2:1000 to 40:1000 w/w boehmite solid, more preferably 3:1000 to 30:1000 w/w boehmite solid and most preferably 5:1000 to 25:1000 w/w boehmite solid.

A particular advantage of the compositions of the invention is their use as components of coating materials in view of their improved dispersability and flowability after subjection to high shear.

Coating compositions using dispersants of the invention may be applied to one or both of a substrate surface through pre-metered or post-metered coating methods. These methods may include dip-coating, wound-wire rod coating, grooved rod coating, smooth rod coating, air knife coating, bent or bevelled blade coating, gravure coating, forward roll coating, reverse roll coating, multiple roll coating, slide coating, bead coating, extrusion coating and curtain coating. Known coating and drying methods are described in further detail in Research Disclosure No. 308119, published December 1989, pages 1007 to 1008. The coating composition can be coated either from water, water-based mixtures or organic solvents but water is preferred.

The choice of coating process would be determined from the economics of the operation and, in turn, would determine the formulation specifications such as coating solids, coating viscosity and coating speed. After application to the substrate, the coating fluids are generally dried by simple evaporation, which may be accelerated by known techniques such as convection heating. Further treatment, such as calendaring, may be used to apply a surface texture.

The substrate may be, for example, textiles, wood, metal or plastic, depending upon the proposed application. In a preferred embodiment, the substrate or support for use in the invention is paper, resin-coated paper or a transparent support. It may have a thickness of from about 10 to about 500 µm, preferably from about 50 to about 300 µm. Antioxidants, antistatic agents, plasticizers and other known additives may be incorporated into the support, if desired.

If the composition is to be used in an inkjet recording element, the support may be any of those usually used for inkjet receivers, such as resin-coated paper, paper, polyesters, or microporous materials such as polyethylene polymer-containing material sold by PPG Industries, Inc., Pittsburgh, Pa. under the trade name of TESLIN™, TYVEK™ synthetic paper (DuPont Corp.), and OPPalyte™ films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683 and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers from high end papers, such as photographic paper, to low end papers, such as newsprint.

It will be shown hereinafter that a dispersant of the invention does not adversely affect the gloss or porosity of a coated system, such as an inkjet element after drying. Thus the dispersant can be added to standard formulations without adversely affecting its suitability therefor, whilst allowing for improved processability, transportation and coating without the viscosity of the formulation rising to unacceptable levels or gelation of the formulation. It is particularly useful therefore for coating an inkjet media element.

The patents and publications referred to herein are incorporated by reference in their entirety.

The invention will now be described with reference to the following examples, which are not however to be construed as limiting the scope thereof.

EXAMPLES

Synthesis of Dispersants

The dispersants may be prepared by methods analogously to the examples herein and in accordance with Makromoleculare Chemie, (1992), 193(9), pages 2505-2517.

Example A

Synthesis of Compound (I-1a)

Mercaptosuccinic acid (15.0 g, 0.100 mol), acrylamide (50.00 g, 0.700 mol) and 2,2'-azobis(2-methylpropionitrile) (1.1 g) were suspended in methanol (1000 ml) in a 3N flask equipped with a reflux condenser. The mixture was degassed for 20 min. by bubbling through argon and then brought to reflux under argon atmosphere. Reflux was continued for a total of 72 h to ensure complete consumption of the monomer. The solid white mass that formed on cooling was washed with methanol, re-dissolved in water and freeze-dried to give a white solid (34.3 g, 52%). Analysis was consistent with the desired structure.

Example B

Synthesis of Compound (I-2a)

Mercaptosuccinic acid (1.51 g, 0.010 mol), N,N-dimethylacrylamide (6.94 g, 0.070 mol) and 2,2'-azobis(2-methylpropionitrile) (0.10 g) were suspended in methanol (150 ml) in a 3N flask equipped with a reflux condenser. The mixture was degassed for 20 min. by bubbling through argon and then brought to reflux under argon atmosphere. Reflux was continued for 24 h. The resulting solution was evaporated under reduced pressure to give a pale yellow gum (8.49 g, 100%). Analysis was consistent with the desired structure.

COMPARATIVE EXAMPLES

The efficacy of the dispersants of the invention was tested further by comparing their performance against a control with no dispersant and with a range of representative materials from the prior art. The compounds used in the above comparisons, are listed below:

| Dispersant | Structure | $M_n/$ g·mol$^{-1}$ | Name |
|---|---|---|---|
| C1 | 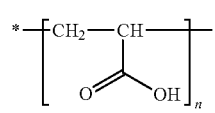 | 2000 | Polyacrylic acid (Aldrich) |

-continued

| Dispersant | Structure | $M_n$/ g·mol$^{-1}$ | Name |
|---|---|---|---|
| C2 | | 350.2 | 1,2-dihydroxybenzene-3,5-disulfonic acid (TIRON ™) |
| C3 | | 473.4 | Aurintri-carboxylic acid (ALUMINON ™) |
| C4 | | 1500 | Polyacrylamide (N10) |
| C5 | | 192.1 | Citric acid |
| C6 | | 118.1 | Succinic acid |
| C7 | | 150.2 | Mercapto-succinic Acid |
| C8 | | 60.5 | Acetic Acid |
| C9 | | 1310 (1.66) | PEO polymer |

| Dispersant | Structure | $M_n/$ g·mol$^{-1}$ | Name |
|---|---|---|---|
| C10 | 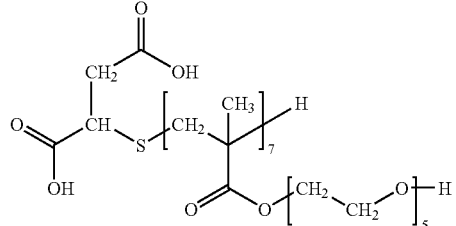 | 2245 (1.78) | PEO polymer |

Example 1

Control 1: Catapal™ 200/PVA Dispersion in Water with No Dispersant 6.55 g of Catapal™ 200, average crystallite size of 40 nm, were weighed out into a glass vial, 10.08 g of water added and the resulting dispersion was stirred. The sample was allowed to disperse for approx. 20 min. after which 1.12 g of the polyvinyl alcohol Gohsenol™ GH17 solution (17.5% w/w) was added and stirred in. The final composition on a w/w basis was: 36.9% Catapal™ 200, 1.1% Gohsenol™ GH-17 and 62% of a dilute aqueous solution of the dispersant. The sample was allowed to disperse further overnight and thereafter the rheology of the systems was measured at 20 C using a Bohlin™ CS50 rheometer with a C2.3/26 small-sample cell and the measurements recorded in the form of curves of viscosity versus shear stress, both scaled logarithmically, as shown in FIG. 1.

The rheological curves were consistently measured using a delay time that is inversely proportional to the applied stress, set to 60 s at 0.04 Pa stress and four curves A, B, C and D, were derived which depended on the history of shear stress applied.

Curve (open circles) A relates to the initial 'U1' state of the system under low to intermediate shear stress (about 0.04-10 Pa) before the application of high shear stress, wherein the system maintains a low viscosity with varying shear stress.

Curve B (open triangles) relates to the effect on the U1 state when it is taken from 0.04 Pa to high shear stress of about 1000 Pa, passing through shear thickening at a stress of about 200-300 Pa.

Curve C relates to the 'T1' state, which occurs when the application of the high shear stress (as applied in curve B) is stopped suddenly. The resulting T1 state differs substantially from the U1 state, the viscosity at low shear stress of the T1 state being 3 orders of magnitude greater than that of the initial U1 state.

Once the system has reached the T1 state, it never returns to the U1 state.

Curve D relates to the 'T2' state of the system, which occurs when the application of high shear stress is decreased in a steady controlled manner after passing through the shear thickening zone in curve B, i.e. 10 s sampling per data point. When the shear is decreased steadily in this manner towards 10 Pa, as described by Curve D, the viscosity of the system climbs steeply, as shown by the steeply climbing vertical curve, until the system eventually gels to reach the T2 state and has become a yield stress material.

Once the system has reached the T2 state, it can be shear-thinned dramatically with increasing shear stress above the yield stress such that its curve essentially follows a similar line to Curve D, such that the shear-thinning curve will merge with Curves C and B at high shear stresses approaching 1000 Pa. However, if the shear stress is then decreased, its behaviour depends on the rate of decrease of shear stress. If the shear stress is stopped abruptly, its behaviour returns to that of the T1 state: if the shear stress is reduced gradually, as before, the system gels again, i.e. it returns to the T2 state.

Once the system has reached either the T1 or T2 states, it never returns to the U1 state. The problems, as identified previously, are the high viscosity at low shear stress of the T1 state and the tendency of the system to form a yield stress material or gel, i.e. the system reaches its T2 state.

Two simple parameters 1 and 2 were adopted from the rheological measurements to represent the above two problems (FIG. 2) in which Curve C shows the T1 state taken from low to high shear stress and Curve D shows the T2 state taken from high to low shear stress incrementally.

Parameter 1 (P1). The T1 state was characterized by its low-shear viscosity (Pa·s) at a shear stress of 0.04 Pa as in Curve C:

Parameter 2 (P2). The tendency of the T2 state to gel was characterized by its yield stress at 1000 Pa·s—the higher the value the stronger the tendency to gel.

Figure 2:
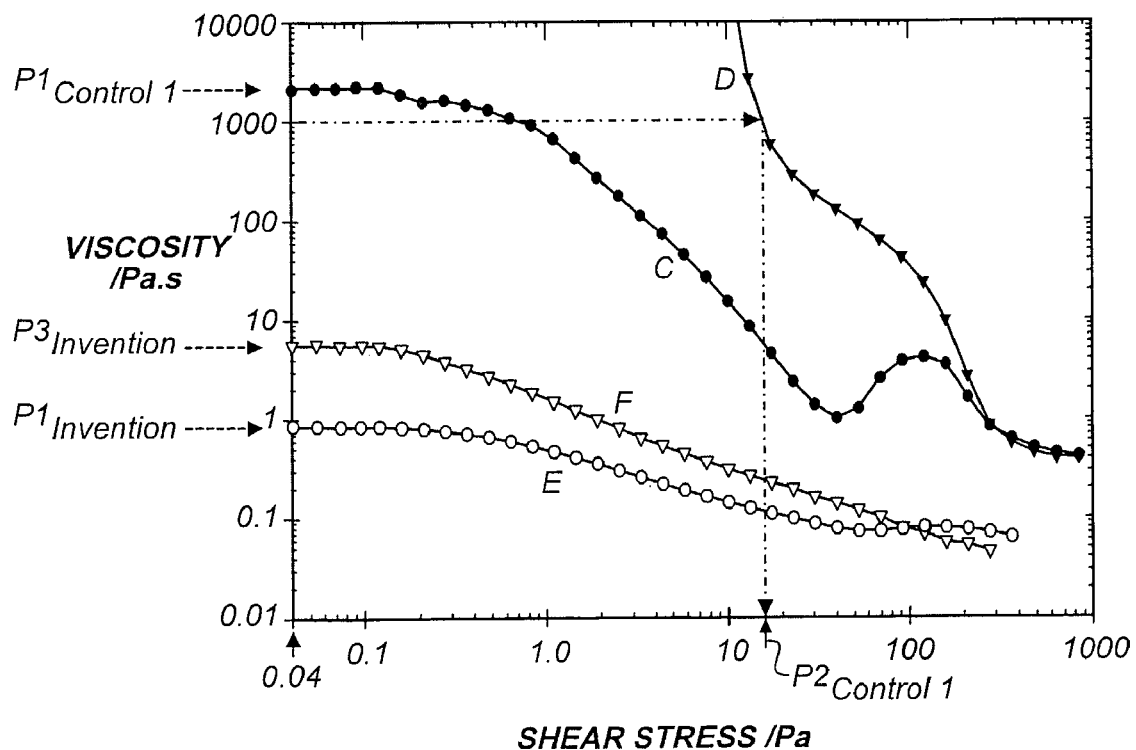
FIG. 2 shows the flow curves C, D for the 'Control' and curves E and F for the 'Control'+dispersant of the invention I-1b and associated parameters.

Given that its T2 state showed gelation and a high value of shear stress at a viscosity of 1000 Pa·s, both Parameters 1 and 2 characterize Control 1. (A further parameter, Parameter 3, P3, as also shown in FIG. 2 was adopted for dispersions also containing a dispersant of the invention, as explained hereinafter).

The rheology of the control systems with comparison dispersants exemplified below was measured as described in Example 1 and the data entered in Table 1.

Example 2

Control 1+Comparison Dispersant C1

A 0.5% w/w solution of C1 was prepared, giving a final pH of 2.92. A 6% w/w dispersion of Catapal™ 200 was also prepared in a similar manner to Example 1. A range of 10 g dispersions were then prepared by adding the 6% Catapal™ 200 dispersion in 50:50 proportions w/w to solutions containing various amounts of the 0.5% solution of C1 in water. The compositions were such that the Catapal™ 200 concentration was constant at 3% w/w and the composition of C1 was varied so that its final concentration ranged from zero to 0.15% w/w in 0.05% intervals, i.e. ranging from 17:1000 to 50:1000. The samples were shaken for rapid and complete mixing.

With zero dispersant, the final dispersion was cloudy and remained cloudy with time. With the samples containing C1, all the systems phase separated giving precipitated solids, hence indicating aggregation. Accordingly it was not possible to measure the rheology of the samples and hence there are no data entries in Table 1. It was concluded that C1 is an unsuitable dispersant for Catapal™ 200 dispersions.

In Examples 3-12 the dispersion was made up as in Example 1 except that water was replaced with the dispersant concerned to give a final composition on a w/w basis of 36.9% Catapal™ 200, 1.1% Gohsenol™ GH-17, and 62% of a dilute aqueous solution of the dispersant.

Example 3

Control 1+Comparison Dispersant C2

An aqueous dispersion of Catapal™ 200 was made with an aqueous solution of C2 (TIRON™) to give a ratio of dispersant to Catapal™ 200 of 1:1000.

Although C2 reduced the low shear viscosity of the T1 state relative to the control in Example 1, it still gelled in its T2 state. Higher concentrations of C2 were also tested (0.06%, 0.1%, 0.25%, 0.5% and 1.0%), but at these concentrations all the systems aggregated.

Example 4

Control 1+Comparison Dispersant C3

An aqueous dispersion of Catapal™ 200 was made with an aqueous solution of C3 (ALUMINON™) which was tested over the following final concentration range: 0.02%, 0.04%, 0.06%, 0.1%, 0.25%, 0.5%, 1.0%, representing a concentration range of dispersant to Catapal™ 200 of 1:1000 to 27:1000. At concentrations ≧0.06% all systems aggregated. However rheological data measured for the system containing 0.02% C3, where the ratio of dispersant to Catapal™ 200 was 0.5:1000, showed that even at this low concentration C3 was worse than the control in Example 1. Thus it increased both Parameters 1 and 2, i.e. it increased the low shear viscosity of the T1 state and increased the shear stress of the T2 state at a viscosity of 1000 Pa.

Example 5

Control 1+Comparison Dispersant C4

An aqueous dispersion of Catapal™ 200 was made with an aqueous solution of C4 which was tested over the following final concentration range: 0.1%, 0.2%, 0.4%, 0.6%, 1.0%, representing a concentration range of dispersant to Catapal™ 200 of 3:1000 to 27:1000. The most effective result for reducing the viscosity of the T1 state was obtained with 0.1% concentration. Relative to the control in Example 1, the dispersant reduced both Parameters 1 and 2 but the existence of Parameter 2 means that the systems tend to gel in the T2 state.

Example 6

Control 1+Comparison Dispersant C5

An aqueous dispersion of Catapal™ 200 was made with an aqueous solution of C5 which was tested over the following final concentration range: 0.04%, 0.06%, 0.07%, 0.09%, 0.12%, 0.16%, 0.20%, representing a concentration range of dispersant to Catapal™ 200 of 1:1000 to 5:1000. The most effective results for reducing both Parameters 1 and 2 were obtained with 0.09% concentration. Relative to the control in Example 1, the dispersant reduced both Parameters 1 and 2 but the existence of Parameter 2 means that the systems tend to gel in the T2 state.

Example 7

Control 1+Comparison Dispersant C6

An aqueous dispersion of Catapal™ 200 was made with an aqueous solution of C6 which was tested over the following final concentration range: 0.04%, 0.08%, 0.12%, 0.20%, 0.41%, representing a concentration range of dispersant to Catapal™ 200 of 1:1000 to 11:1000. The most effective results were obtained with 0.12% concentration for the T1 state and 0.04% concentration for the T2 state. Relative to the control in Example 1, the dispersant reduced both the low shear viscosity of the T1 state and the shear stress of the T2 state. Although the C6 dispersant is more effective than C5 for reducing the viscosity of the T1 state, it is less effective at reducing the shear stress of T2 state and hence shows a higher tendency to gel.

Example 8

Control 1+Comparison Dispersant C7

An aqueous dispersion of Catapal™ 200 was made with an aqueous solution of C7 which was tested over the following final concentration range: 0.044%, 0.082%, 0.12%, 0.20%, 0.40%, representing a concentration range of dispersant to Catapal™ 200 of 1:1000 to 11:1000. The most effective results were obtained with 0.08% concentration for the T1 state and 0.04% concentration for the T2 state. Relative to the control in Example 1, the dispersant reduced both the low shear viscosity of the T1 state and the shear stress of the T2 state, but the existence of Parameter 2 means that the systems tend to gel in the T2 state.

Example 9

Control 1+Comparison Dispersant C8

An aqueous dispersion of Catapal™ 200 was made with an aqueous solution of C8 which was tested over the following final concentration range: 0.026%, 0.042%, 0.075%, 0.10%, 0.21%, 0.30%, 0.40%, 0.50%, 0.60%, 0.75%, 0.90%, 1.10%, representing a concentration range of dispersant to Catapal™ 200 of 1:1000 to 30:1000. The most effective results were obtained with 0.9% concentration for the T1 state and 0.6% for the T2 state. Relative to the control in Example 1, the dispersant reduced both the low shear viscosity of the T1 state and the shear stress of the T2, but the existence of Parameter 2 means that the systems tend to gel in the T2 state.

Example 10

Control 1+1:1 Mixture of Comparison Dispersants, C4 & C7

An aqueous dispersion of Catapal™ 200 was made with an aqueous solution of a 1:1 mixture of C4 and C7 (w/w) which was tested over the following concentration range: 0.15%, 0.25% and 0.5% w/w, representing a total concentration range of dispersants to Catapal™ 200 of 4:1000 to 14:1000. All three concentrations showed aggregation and hence no rheological measurements were made and no meaningful parameters could be entered in Table 1.

Example 11

Control 1+Comparison Dispersant C9

The objective of this example was to test a material with a similar chemical structure to a dispersant of the invention (i.e. possessing an anchor group of the invention+a hydrophilic polymer moiety), wherein however the hydrophilic polymer moiety is likely to possess an affinity for oxide surfaces.

Polyethyleneoxides, otherwise known as polyethyleneglycols (PEG), are known for their propensity to adsorb to oxide surfaces. In this case, a PEG-methacrylate ester C9 was selected as the monomer precursor for the polymeric moiety.

An aqueous dispersion of Catapal™ 200 was made with an aqueous solution of C9 which was tested over the following final concentration range (w/w): 0.40%, 0.80%, 1.2%, 1.6%, representing a concentration range of dispersant to Catapal™ 200 of 11:1000 to 43:1000. The most effective results with C9 were obtained at 1.6% concentration for both the T1 and T2 states Relative to Control 1, C9 reduces the viscosity of the T1 state by almost an order of magnitude, but it is not as effective as several of the prior art dispersants (i.e. C4 to C8). More importantly however, C9 is not capable of maintaining a fluid T2 state when the shear stress of its T2 state is reduced incrementally following high shear. Hence the T2 state is characterized by Parameter 2, which means the system tends to gel under these conditions.

Example 12

Control 1+Comparison Dispersant C10

The objective of this example was to test another dispersant where the hydrophilic polymer part of the structure is likely to possess an increased affinity for oxide surfaces. In this case, a polyethyleneglycol methacrylate ester with a longer PEG component, C10, was selected as the monomer precursor for the polymeric moiety of the structure. In addition to the longer PEG component, the average number of monomer units was increased from 3 to 5.

An aqueous dispersion of Catapal™ 200 was made with an aqueous solution of C10 which was tested over the following final concentration range (w/w): 0.4%, 0.77%, 1.2%, 1.6%, representing a concentration range of dispersant to Catapal™ 200 of 11:1000 to 43:1000. The most effective results with C10 were obtained at 1.2% concentration for the T1 state and 0.77% concentration for the T2 state.

Similar results to Example 11 regarding the T1 and T2 states are obtained as for C9 and in particular the T2 state is characterized by Parameter 2, which means the system tends to gel.

The results support the above hypothesis that the hydrophilic polymer of the invention needs to possess a low affinity for the surface of the dispersed boehmite to function satisfactorily in accordance with the invention. The similarity in the poor performance of the C9 and C10 as dispersants suggests that the unsuitability of a PEG-methacrylate moiety as a polymeric component of this invention is not critically dependent on its total PEG content (relative to C9, C10 contains more than twice the average number of moles of ethyleneglycol).

Example 13

Control 2: Catapal™ 200 Dispersion with an Alternative Binder, Polyvinylpyrrolidone (PVP)

An aqueous dispersion of Catapal™ 200 was made as in Example 1 with the exception that a different binder, namely PVP (molecular weight=40 kD), was used in place of PVA. The final composition on a w/w basis was: 36.9% Catapal™ 200, 1.1% PVP (MW=40 kD) and 62% water. The system gave very similar rheological characteristics to the original control system with PVA binder represented in Example 1 (Control 1), particularly in regard to its exhibition of T1 and T2 states together with corresponding high values of Parameters 1 and 2 respectively.

It appears that changing the binder from PVA to PVP makes little difference to the rheological behaviour of the basic Catapal™ 200 system and hence the system will show a strong tendency to gel after slow relaxation from high shear. Thus the binder does not alleviate the rheological problems encountered in aqueous Catapal™ 200 dispersions of high weight fraction at the concentrations considered.

Example 14

Control 3: Catapal™ 200 Dispersion in Water Alone (No Binder)

An aqueous dispersion of Catapal™ 200 was made up in water alone as in Example 1, but without the PVA binder. The final composition of the aqueous dispersion on a w/w basis was 37.0% Catapal™ 200 and 63.0% water. The system gave very similar rheological characteristics to the original control system with PVA binder represented in Example 1 (Control 1), particularly in regard to its exhibition of T1 and T2 states together with corresponding high values of Parameters 1 and 2 respectively.

The high value of yield stress (15 Pa) indicates a strong tendency to gel but this example suggests that the binder is not a significant driver in producing a yield-stress material following a high shear condition.

Example 15

Control 4: Catapal™ 200 Dispersion with Dilute Nitric Acid

Aqueous dispersions of Catapal™ 200 were made up as in Example 14 except that an aqueous solution of nitric acid was used in place of the water. The final composition of the aqueous dispersions on a w/w basis was 40% Catapal™ 200 and 60% aqueous solution of nitric acid. The aqueous solution of nitric acid was varied over the following concentration range (mM): 3, 5, 10, 16, 18, 30, 41, 51, 76, 101. The most effective reduction of viscosity was obtained at 51 mM nitric acid concentration for both the T1 and the T2 states. The nitric acid is reasonably effective at reducing the low shear viscosity of the T1 state (Parameter 1) but in its T2 state it results in a yield stress material at a shear stress 2.2 Pa, and hence is characterized by Parameter 2, which means the T2 system tends to gel.

Example 16

Control 5: Disperal™ HP22/PVA Dispersion with 0.15M Nitric Acid

In this example Disperal™ HP22, a boehmite manufactured by Sasol having an average crystallite size of 22 nm was used, i.e. smaller average crystallite size than that of Catapal™ 200. The manufacturer's instructions suggest that Disperal™ HP22 should be dispersed in 0.15M nitric acid or similar acid. However, dispersed systems containing a high weight fraction of Disperal™ HP22 in 0.15M nitric acid can exhibit the same gelling behaviour as that found with dispersed systems of Catapal™ 200 at high weight fraction (see Examples 1, 13 and 14). This is demonstrated in the following example.

An aqueous dispersion of Disperal™ HP22 was made up as for Catapal™ 200 in Example 1, such that the final composition was 41.8% Disperal™ HP22 and 58.2% aqueous nitric acid (0.15M), nitric acid playing the role of dispersant as recommended by the manufacturer. In the presence of the recommended amount of nitric acid, the Disperal™ HP22 system shows viscosities for its T1 and T2 states that are not dissimilar to the Catapal™ 200 control system with nitric acid (Control 4) in Example 15 at 40% solids. As in Example 15, the T2 state is characterized by Parameter 2, so the system shows a tendency to gel after slow relaxation from high shear.

Example 17

Control 6: Disperal™ 60/PVA Dispersion in Water with No Dispersant

In this example Disperal™ 60, a boehmite also manufactured by Sasol and having an average crystallite size of 50-60 nm, i.e. larger average crystallite size than that of Catapal™ 200, was used. An aqueous dispersion of Disperal™ 60 was made up for Catapal™ 200 in Example 1, such that the final composition on a w/w basis was 50% Disperal™ 60, 1% PVA and 49% water. When compared with the Catapal™ 200 system in Example 1, the Disperal 60 system shows the same shear-thickening transition as the Catapal™ 200 system and gives the same type of T1 and T2 states, although the larger crystallite size appears to lead to generally lower viscosities at low shear. Despite the lower viscosity the T2 state is characterized by Parameter 2, i.e. a tendency to gel after slow relaxation from high shear.

Example 18

Control 6: Disperal™ 60 Dispersion in Water with Dispersant C5

An aqueous dispersion of Disperal™ 60 was made up as described for Catapal™ 200 in Example 1, such that the final composition on a w/w basis was 50% Disperal™ 60 and 50% of an aqueous solution of C5 in water. C5 was tested over the following w/w concentration range, 0.12%, 0.33% and 1.1%. All three concentrations showed aggregation, hence no rheological measurements were made and hence no parameters could be entered in Table 1. These results suggest that the dispersant C5 is unsuitable for direct use as a dispersant in aqueous dispersions of Disperal™ 60 without the help of some other additive.

TABLE 1

RHEOLOGICAL PROPERTIES OF COMPARATIVE EXAMPLES

| Ex. No. | Test System + Comparison Dispersant | PARAMETER 1 Min. T1 state low shear viscosity/Pa·s (w/w % conc. disp.) | PARAMETER 2 T2 state for yield stress material, Shear stress/Pa at 1000 Pa·s viscosity (w/w % conc. disp.) | PARAMETER 3 T2 state for fluid material, Viscosity/Pa·s at 0.04 Pa shear stress (w/w % conc. disp.) |
|---|---|---|---|---|
| 1 | Control 1 (Catapal™ 200 in aqueous PVA + no dispersant) | 2000 | 16 | |
| 2 | Control 1 + C1 | Aggregation (≧0.05%) | Aggregation (≧0.05%) | |
| 3 | Control 1 + C2 | 40 (0.04%) Aggregation (≧0.06%) | 9 (0.02%) Aggregation (≧0.06%) | |
| 4 | Control 1 + C3 | >10000 (0.02%) Aggregation (≧0.06%) | 48 (0.02%) Aggregation (≧0.06%) | |
| 5 | Control 1 + C4 | 24 (0.1%) | 9.5 (0.1%) | |
| 6 | Control 1 + C5 | 20.3 (0.09%) | 0.4 (0.09%) | |
| 7 | Control 1 + C6 | 8.0 (0.12%) | 3.0 (0.04%) | |
| 8 | Control 1 + C7 | 22.2 (0.08%) | 4.2 (0.04%) | |
| 9 | Control 1 + C8 | ~7.5 (0.9%) | 0.9 (0.6%) | |
| 10 | Control 1 + C4 + C7 (1:1) | Aggregation (0.15-0.50%) | Aggregation (0.15-0.50%) | |
| 11 | Control 1 + C9 | 35 (1.6%) | 1.2 (1.6%) | |
| 12 | Control 1 + C10 | 35 (1.2%) | 1.1 (0.77%) | |
| Ex. 13 | Control 2 (Catapal™ 200 in aqueous PVP + no dispersant) | 2000 | 5.3 | |
| 14 | Control 3 (Catapal™ 200 + no PVA + no dispersant) | 2000 | 15 | |
| 15 | Control 4 (Catapal™ 200 + 0.051M HNO$_3$ + PVA | 7 | 2.2 | |
| 16 | Control 5 (Disperal™ HP 22 dispersed in 0.15M HNO$_3$) | 14 | 0.6 | |

TABLE 1-continued

RHEOLOGICAL PROPERTIES OF COMPARATIVE EXAMPLES

| Ex. No. | Test System + Comparison Dispersant | PARAMETER 1 Min. T1 state low shear viscosity/Pa · s (w/w % conc. disp.) | PARAMETER 2 T2 state for yield stress material, Shear stress/Pa at 1000 Pa · s viscosity (w/w % conc. disp.) | PARAMETER 3 T2 state for fluid material, Viscosity/Pa · s at 0.04 Pa shear stress (w/w % conc. disp.) |
|---|---|---|---|---|
| 17 | Control 6 (Disperal™ 60 in aqueous PVA + no dispersant) | 3.1 | 0.3 | |
| 18 | Control 7 (Disperal™ 60 + C5 in water) | Aggregation (0.12-1.1%) | Aggregation (0.12-1.1%) | |

Table 1 contains a selection of the types of acid-based and neutral salt materials disclosed in the prior art for reducing the viscosity of aqueous alumina dispersions. In addition, it contains examples relating to two of the individual chemical moieties of one of the preferred dispersants of the invention. In this context, the individual moieties have been tested in isolation and as a 1:1 mixture. It also includes examples of polymeric dispersants with a polymeric block having affinity for an oxide surface. None of these systems overcome, in particular, the gelation problem found with Catapal™ 200 dispersions following high shear treatment. Other examples illustrate applicability to boehmites with other primary crystallite sizes that a binder is not essential and the effect of increasing polymer chain length on viscosity.

In summary, Example 1 is the control without dispersant and Example 2 shows that the polycarboxylic acid system, C1, showed a strong tendency to cause aggregation. Examples 3 and 4 containing the neutral salt dispersants C2 and C3 respectively (known commercially as TIRON™ and ALUMINON™) resulted in a yield stress material for the T2 state, being defined by a Parameter 2 value, showing a tendency to gel after slow relaxation from high shear. In fact, C3 caused aggregation at concentrations ≧0.06%.

The results with C4 in Example 5 demonstrate that a polyacrylamide homopolymer—a preferred chemical moiety in the dispersant of the invention—is capable in its own right of reducing the low shear viscosity of the T1 state relative to Control 1 in Example 1 but has little impact on the T2 state relative to Control 1, the system being defined by a Parameter 2 value. Whereas in Example 6, C5 (citric acid) reduced the Parameters 1 and 2 in the Catapal™ 200 from the control system (Control 1) in Example 1, it caused aggregation at all three test concentrations in the Disperal™ 60 control system (Control 7) in Example 18. Examples 7 to 9 show that the acid-based dispersants, C6 to C8, reduce the low shear viscosity of the T1 state of the Catapal™ 200 system relative to Control 1, C6 (succinic acid) and C8 (acetic acid) being the most effective. However, all these systems possess a tendency to gel as evidenced by the entries in the Parameter 2 column. The results with C7 in Example 8 demonstrate that mercaptosuccinic acid—another preferred chemical moiety in the dispersant of the invention—is also capable in its own right of reducing the low shear viscosity of the T1 state relative to Control 1 in Example 1. However, these results also demonstrate that mercaptosuccinic acid has little impact on the T2 state relative to Control 1, and the system is defined by a Parameter 2 value.

Example 10 demonstrates that if two of the preferred chemical moieties of the invention from Examples 5 and 8 (C4 and C7) are mixed together on a 1:1 basis, the system aggregates so the mixture of the two actually destroys the stability of the system.

Examples 11 and 12 show that when comparative dispersants C9 and C10, where an anchoring moiety of the invention was combined with two different polymer moieties based on polyethyleneglycol methacrylate esters were used, both systems resulted in yield stress materials when subjected to high shear stress followed by a slow incremental reduction in shear, i.e. the systems tend to gel.

Examples 13 and 14 demonstrate that the rheological problems seen in Example 1 are present irrespective of binder type and binder level. Another commonly recommended acidic dispersant for alumina dispersions, nitric acid, was tested in Catapal™ 200 and Disperal™ HP22 systems in Examples 15 and 16 respectively. Both these cases, resulted in a yield stress material for the T2 state, i.e. they were defined by a Parameter 2 value. Finally Example 17 shows that Disperal™ 60 exhibits the same rheological problems as Catapal™ 200.

EXAMPLES OF THE INVENTION

Example 19

Control 1+Dispersant of the Invention I-1a

An aqueous dispersion of Catapal™ 200 was made up as in Example 1 with the exception that an aqueous solution of a dispersant of the invention (I-1a) was used in place of the water. The final composition on a w/w basis was 36.9% Catapal™ 200, 1.1% Gohsenol™ GH-17 and 62% of a dilute aqueous solution of the dispersant. I-1a was tested over the following final concentration range (w/w): 0.01%, 0.11%, 0.30%, 0.50%, 0.59%, 0.69%, 0.79%, 0.88%, 0.94%, 1.98%, representing a concentration range of dispersant to Catapal™ 200 of 0.3:1000 to 54:1000. The most effective results with I-1a were obtained at 0.5% concentration for the T1 state and at 0.3% concentration for the T2 state.

The presence of I-1a reduces the low shear viscosity of the T1 state (Parameter 1) of Control 1 system to an order of magnitude lower than any of the control dispersants, C1 to C8. More significantly, the presence of I-1a reduces the viscosity of the T2 state to that of a fluid-like, non-gelling material. This is evidenced by the shape of its viscosity/shear-stress curve between 0.04-10 Pa shear stress, which more closely resembles that of the fluid U1 state (Curve A in FIG. 1) than that of the typical gelling T2 state (Curve D in FIG. 1), which shows a characteristic steep-rising attitude. Thus the viscosity of the fluid-like non-gelling T2 system tends to plateau out as the shear stress is reduced towards 0.04 Pa shear stress and never reaches a viscosity of 1000 Pa·s like the gelling systems.

These levelling values of the low shear viscosity are typically greater than that obtained for the T1 state, and hence an alternative parameter is necessary to characterize their T2 state—Parameter 3. Parameter 3 is defined as the low shear viscosity of the non-gelling T2 state at 0.04 Pa·s (the lowest value of shear stress measured).

FIG. 2, pertaining in fact to a dispersant of the invention I-1b, illustrates the difference between the T2 state of the Control 1 system (Curve D), characterised by Parameter 2, and the T2 state of the Control 1 system with a suitable level of a dispersant of the invention present (Curve F) (0.4% I-1b w/w), characterised by Parameter 3. Curve E shows the corresponding T1 state of the Control 1 system+dispersant Parameter 3 The fluid-like, i.e. non-gelling, T2 state with a
    levelling value of low shear viscosity at 0.04 Pa shear stress as in Curve F.

It also illustrates a typical behaviour for a system with a dispersant of the invention present inasmuch as Parameter 3 is typically higher than Parameter 1. However, several examples exist where Parameter 3 and Parameter 1 show essentially the same value.

Given the definition for Parameter 2 it appears that Parameter 3 is only realized if the low shear viscosity is <1000 Pa·s at a shear stress of 0.04 Pa. Thus the systems cannot exhibit all 3 parameters: gelling systems are effectively characterized by exhibition of Parameters 1 and 2: non-gelling systems are effectively characterized by exhibition of Parameters 1 and 3.

Since the non-gelling T2 states are characterized by a low shear viscosity (like the U1 state), the net result is that this non-gelling example for dispersant 1-1b institutes an entry in the Parameter 3 column and not the Parameter 2 column in Table 2. This is in strong contrast to that obtained with the T2 state of the Control 1 system (Example 1) or the T2 state of the Control 1 system containing any of the comparative dispersants (C1 to C10—Examples 2-12), which all show a tendency to gel and exhibit a viscosity >1000 Pa·s, i.e. they institute an entry in the Parameter 2 column.

In summary, the dispersant of the invention (I-1a) shows two distinct advantages over any of the comparative dispersants in the Control 1 system, following periods of high shear: it prevents the system from gelling and significantly reduces the viscosity of the T1 state.

Example 20

Control 1+Dispersant of the Invention I-1a+20 mM Nitric Acid

The objective of this example was to test the combination of a dispersant of the invention with an acid.

An aqueous dispersion of Catapal™ 200 was made up as in Example 19, with the exception that the aqueous solution containing (I-1a) was acidified with nitric acid ($HNO_3$), such that the solution was 20 mM $HNO_3$ (pH 2.8). The final composition on a w/w basis was 36.9% Catapal™ 200, 1.1% Gohsenol™ GH-17 and 62% aqueous solution containing I-1a and 20 mM $HNO_3$. I-1a was tested over the following final concentration range (w/w): 0.11%, 0.20%, 0.30%, 0.40%, 0.49%, representing a concentration range of dispersant to Catapal™ 200 of 3:1000 to 13:1000. The most effective results were obtained with 0.2% concentration of 1-1a for both the T1 and T2 states.

Comparing these results with those of Example 19, which contained no acid, in the presence of nitric acid I-1a is both more effective and more efficient at reducing the low shear viscosity of the T1 state (Parameter 1), i.e. a greater maximum viscosity reduction is achieved and less dispersant is required to obtain the maximum effect. Furthermore, in the presence of nitric acid, I-1a is also both more effective and more efficient at preventing gelling and reducing the low shear viscosity of the resultant T2 state (Parameter 3) and less dispersant is required to obtain the maximum effect.

Control 4 in Example 15 teaches that when the Catapal™ 200 is dispersed in aqueous nitric acid alone at approximately 40 wt % solids, the system tends to gel in its T2 state following periods of high shear. Hence in the current example it appears that the presence of the dispersant is critical in avoiding the gelling tendency.

Example 21

Control 1+Dispersant of the Invention I-1b

The objective of this example was to test the effect of lengthening the polyacrylamide block of the dispersants of the invention of structural type, I-1.

An aqueous dispersion of Catapal™ 200 was made up as in Example 19, with the exception that I-1a (average no. acrylamide monomer units=15), was substituted with another dispersant of the invention of structural type 'I-1' with a longer polyacrylamide block, namely I-1b (average no. acrylamide monomer units=21). I-1b was tested over the following final concentration range (w/w): 0.20%, 0.40%, 0.80%, 1.2%, representing a concentration range of dispersant to Catapal™ 200 of 5:1000 to 32:1000. The most effective results with I-1b were obtained at 0.8% concentration for the T1 state and at 0.4% concentration for the T2 state.

The presence of I-1b substantially reduces the low shear viscosity of the T1 state of Control 1 system compared to Control 1 system in the absence of a dispersant and also to that which can be obtained with any of the control dispersants, C1 to C10 (Examples 2-12). I-1b is slightly more effective than I-1a in this respect (Example 19), suggesting that a longer polyacrylamide block may be slightly more effective for viscosity reduction when considering dispersants with the I-1 structure.

Also like I-1a, the presence of I-1b reduces the viscosity of the T2 state to that of a fluid-like non-gelling material, which institutes a 'low shear viscosity' entry in the Parameter 3 column in Table 2. This is in strong contrast to that obtained with the T2 state of the Control 1 system (Example 1) or the T2 state of the Control 1 system containing any of the comparative dispersants, C1 to C10, (cf. Examples 2-12) which all show a tendency to gel and exhibit viscosities >1000 Pa·s, i.e. they institute an entry in the Parameter 2 column. I-1b is over an order of magnitude more effective at reducing the low shear viscosity of the T2 state than I-1a, showing that dispersants of the invention with the I-1 structure are much more effective at reducing viscosity and gelling tendencies in aqueous Catapal™ 200 dispersions (following periods of high shear) when the average length of polyacrylamide component is increased from 15 to 21 monomer units.

Example 22

Control 1+Dispersant of the Invention I-1c

The objective of this example is to test further the effect of lengthening the polyacrylamide moiety of the dispersants of the invention of structural type, I-1.

An aqueous dispersion of Catapal™ 200 was made up in the same way as in Example 21, with the exception that I-1b (average no. acrylamide monomer units=21) was substituted with another dispersant of the invention of structural type I-1 with a longer polyacrylamide moiety, namely I-1c (average no. acrylamide monomer units=27). I-1c was tested over the following final concentration range (w/w): 0.20%, 0.40%, 0.80%, 1.2%, representing a concentration range of dispersant to Catapal™ 200 of 5:1000 to 32:1000. The most effective results with I-1c were obtained at 1.2% concentration for both the T1 and T2 states. Dispersant I-1c reduces the low shear viscosity of the T1 state considerably more than do the comparison dispersants and also reduces the viscosity of the T2 state to that of a fluid, non-gelling material. Moreover it is significantly more effective than I-1a in Example 19, showing that the longer polyacrylamide block (x=27 versus x=15) is more effective for viscosity reduction when considering dispersants with the I-1 structure. Thus the results in Table 2 confirm that these dispersants also become increasingly more effective at reducing the viscosity and gelling tendencies of aqueous Catapal™ 200 dispersions (following periods of high shear) as the average length of their polyacrylamide component is increased step-wise from 15 to 21 to 27 monomer units.

In the absence of dispersant, the U1 low shear viscosity is 2 Pa·s. At a concentration of 0.80% I-1c the low shear viscosity of the U1, T1 and T2 states is 0.24 Pa·s. Therefore dispersant I-1c reduces the viscosity of the unsheared dispersion and gives a dispersion with rheology independent of shear history.

Example 23

Control 2+Dispersant of the Invention I-1c+PVP Binder

The objective of this example was to find out if a dispersant of the invention would alleviate the rheological problems encountered in aqueous Catapal™ 200 dispersions of high weight fraction in the presence of a binder other than PVA.

The Control 2 system in Example 13, which contained PVP binder in place of PVA (Goshenol™ GH-17), was selected as a test case. In Example 13, the exchange of binders (PVP for PVA—defined as Control 2) did not alleviate the rheological problems encountered in aqueous Catapal™ 200 dispersions of high weight fraction.

An aqueous dispersion of Catapal™ 200 was made up in the same way as Control 2 in Example 13, with the exception that an aqueous solution of I-1c was used in place of water. The final composition on a w/w basis was: 36.9% Catapal™ 200, 1.1% PVP (MW=40 kD) and 62% of a dilute aqueous solution of the dispersant. I-1c was tested over the following final concentration range (w/w): 0.10%, 0.30%, 1.02%, representing a concentration range of dispersant to Catapal™ 200 of 3:1000 to 28:1000. The most effective results with I-1c were obtained at 1.02% concentration for the T1 state and at 0.3% concentration for the T2 state.

I-1c is 4 orders of magnitude more effective at reducing the low shear viscosity of the T1 state than the Control 2 system without dispersant (Example 13). More significantly, it reduces the viscosity of the T2 state to that of a very fluid-like, non-gelling material, i.e. it possesses a relatively small low shear viscosity. This is in strong contrast to that obtained with the T2 state of the Control 2 system (Example 13) which exhibits a viscosity >1000 Pa·s and shows a tendency to gel (characterized by an entry in the Parameter 2 column).

The Parameter 1 and Parameter 2 values obtained with I-1c in the Control 2 system (Example 23) are almost identical to those obtained with dispersant I-1c in the Control 1 system (Example 22). Hence the change of binder from a PVA to a PVP polymer has little influence on the rheology of an aqueous Catapal™ 200 dispersion in the presence of the dispersant.

Therefore use of these dispersants may expand the range of binders that may be included in boehmite formulations.

Example 24

Control 3+Dispersant of the Invention I-1c in Water Alone (No Binder)

The objective of this example was to find out if a dispersant of the invention would alleviate the rheological problems obtained with Control 3 in Example 14, i.e. an aqueous boehmite dispersion in the absence of binder.

An aqueous dispersion of Catapal™ 200 was made up in the same way as Control 3, with the exception that an aqueous solution of I-1c, was used in place of water. The final composition on a w/w basis was: 37.0% Catapal™ 200 and 63.0% of a dilute aqueous solution of I-1c. I-1c was tested over the following final concentration range (w/w): 0.10%, 0.30%, 0.5%, and 1.0%, representing a concentration range of dispersant to Catapal™ 200 of 3:1000 to 27:1000. The most effective results with I-1c were obtained at 1% concentration for both the T1 and T2 states.

I-1c is almost 5 orders of magnitude more effective at reducing the low shear viscosity of the T1 state than the Control 3 system without dispersant. More significantly, the presence of I-1c reduces the viscosity of the T2 state to that of a very fluid-like, non-gelling material, i.e. it possesses a relatively small low shear viscosity. This result is in strong contrast to that obtained with the T2 state of the Control 3 system, which contains no dispersant and behaves as a yield stress material with a strong tendency to gel.

The results of this example can be compared directly with Examples 22 and 23, which possess the same composition as this example, but with the exception that they also possess 1.1% of binder: the binders being PVA and PVP respectively. The fact that the values of Parameter 1 and Parameter 2 are of the same order in all three examples suggests that the binder has little impact on the complex rheology of these systems at the concentrations used.

Example 25

Control 5+Dispersant of the Invention I-1b+Disperal™ HP22

In Control 5 in Example 16, it is demonstrated that an aqueous dispersion of a boehmite with a smaller crystallite size than Catapal™ 200 (Disperal™ HP22) can also give rheological problems following high shear when the concentration of solids is high (in this instance 41.8%), even when nitric acid is present to aid dispersion in accordance with the manufacturer's recommendations. The objective of this example is to find out whether these rheological problems can be alleviated using a dispersant of the invention.

An aqueous dispersion of Disperal™ HP22 was made as in Control 5 in Example 16, with the exception that an aqueous solution of I-1b plus nitric acid was used in place of the 0.15M nitric acid, such that the overall concentration of nitric acid remained the same at 0.15M. Hence the final composition was 41.8% Disperal™ HP22 and 58.2% of an aqueous solution containing 0.15M nitric acid and I-1b. The dispersant was tested over the following concentration range on w/w basis: 0.11%, 0.21% and 0.30%. The most effective results were obtained with the 0.21% concentration for both the T1 and T2 states Relative to Control 5, the presence of the dispersant significantly reduces the viscosity of the T1 state and changes the nature of the T2 state from a yield stress material (which would exhibit a Parameter 2 entry in Table 2) to a fluid material (exhibiting a Parameter 3 entry in Table 2). Hence the presence of the dispersant of the invention (I-1b) alleviates the rheological problems found with Control 5 following high shear conditions.

Example 26

Control 6+Dispersant of the Invention I-1a+Disperal™ 60

In Control 6 in Example 17, it is demonstrated that an aqueous dispersion of a boehmite with a larger crystallite size than Catapal™ 200 (Disperal™ 60) can also give rheological problems following high shear when the concentration of solids is high. Although the yield stress threshold for the T2 state of Control 6 occurred at low value of shear stress, the T2 system still behaved as a yield stress material with a tendency to gel following a gradual reduction in shear stress from high shear conditions. The objective of this example was to find out whether these rheological problems could be alleviated using a dispersant of the invention.

An aqueous dispersion of Disperal™ 60 was made as in Example 18, with the exception that I-1a was used in place of C5. The final composition on a w/w basis was 50% Disperal™ 60 and 50% of an aqueous solution of I-1a in water. I-1a was tested over the following final concentration range: 0.10%, 0.30%, 1.0%, representing a concentration range of dispersant to Catapal™ 200 of 2:1000 to 20:1000 parts per thousand. The most effective results were obtained with 0.3% concentration for both the T1 and T2 states.

The presence of I-1a alleviates the rheological problems found with Control 6 following high shear conditions. In contrast, a prior art dispersant, C5 (citric acid), actually destabilizes the system by causing aggregation (Control 7).

In the following Examples 27-38 the dispersion was made up as in Example 1 except that water was replaced with the dispersant concerned to give a final composition on a w/w basis of 36.9% Catapal™ 200, 1.1% Gohsenol™ GH-17, and 62% of a dilute aqueous solution of the dispersant.

As will be seen from the results in Table 2, in each of these examples the dispersant of the invention shows two distinct advantages over any of the comparative dispersants in the Control 1 system, following periods of high shear. Thus each dispersant of the invention prevents the T2 system from gelling and significantly reduces the viscosity of the T1 state or is at least is as effective as the prior art dispersant in reducing viscosity (Example 36). It therefore alleviates the rheological problems found with Control 1 following high shear conditions.

Example 27

Control 1+Dispersant of the Invention I-2a

An aqueous dispersion of Catapal™ 200 was made with an aqueous solution of I-2a which was tested over the following final concentration range (w/w): 0.20%, 0.42%, 0.60%, 0.81%, 1.0%, 1.2%, representing a concentration range of dispersant to Catapal™ 200 of 5:1000 to 33:1000. The most effective results with I-2a were obtained at 1.0% concentration for both the T1 and T2 states.

Example 28

Control 1+Dispersant of the Invention I-2b

An aqueous dispersion of Catapal™ 200 was made with an aqueous solution of I-2b which was tested over the following final concentration range (w/w): 0.40%, 0.79%, 1.2%, 1.6%, representing a concentration range of dispersant to Catapal™ 200 of 11:1000 to 43:1000. The most effective results with I-2b were obtained at 1.2% concentration for both the T1 and T2 states.

If Examples 27 and 28 are compared with Examples 19, 21 and 22, the results suggest that the poly-N,N-dimethylacrylamide moiety is not as effective at fluidizing the T2 state as the polyacrylamide moiety, given the di-carboxylic acid anchor group is the same in all cases. Thus the polyacrylamide system appears to be more effective at reducing the low shear viscosity (Parameter 3) of the T2 state than the poly-N,N-dimethylacrylamide system.

Example 29

Control 1+Dispersant of the Invention I-3a

An aqueous dispersion of Catapal™ 200 was made with an aqueous solution of I-3a which was tested over the following final concentration range (w/w): 0.11%, 0.31%, 1.0%, representing a concentration range of dispersant to Catapal™ 200 of 3:1000 to 27:1000. The most effective results with I-3a were obtained at 1.0% concentration for both the T1 and T2 states.

Example 30

Control 1+Dispersant of the Invention I-4a

An aqueous dispersion of Catapal™ 200 was made with an aqueous solution of I-4a which was tested over the following final concentration range (w/w): 0.11%, 0.29%, 1.0%, representing a concentration range of dispersant to Catapal™ 200 of 3:1000 to 27:1000. The most effective results with I-4a were obtained at 1.0% concentration for both the T1 and T2 states.

Example 31

Control 1+Dispersant of the Invention I-4b

An aqueous dispersion of Catapal™ 200 was made with an aqueous solution of I-4b which was tested over the following final concentration range (w/w): 0.09%, 0.30%, 1.0%, representing a concentration range of dispersant to Catapal™ 200 of 2:1000 to 27:1000. The most effective results with I-4b were obtained at 1.0% concentration for both the T1 and T2 states.

Example 32

Control 1+Dispersant of the Invention I-5a

An aqueous dispersion of Catapal™ 200 was made with an aqueous solution of I-5a which was tested over the following final concentration range (w/w): 0.1%, 0.30%, 1.0%, representing a concentration range of dispersant to Catapal™ 200 of 3:1000 to 27:1000. The most effective results with I-5a were obtained at 1.0% concentration for both the T1 and T2 states.

Example 33

Control 1+Dispersant of the Invention I-5b

An aqueous dispersion of Catapal™ 200 was made with an aqueous solution of I-5b which was tested over the following final concentration range (w/w): 0.1%, 0.31%, 1.0%, representing a concentration range of dispersant to Catapal™ 200 of 3:1000 to 27:1000. The most effective results with I-5b were obtained at 0.3% concentration for both the T1 and T2 states.

Examples 32 and 33 with an aminocarboxylic acid anchor suggest that the 1-5 type of dispersant of the invention becomes more effective as the average length of its polyacrylamide component is increased. The same result was found with the I-1 type of dispersant of the invention, which is also based on polyacrylamide but possesses a di-carboxylic acid anchor group (see Examples 19, 21 and 22).

Example 34

Control 1+Dispersant of the Invention I-6a

An aqueous dispersion of Catapal™ 200 was made with an aqueous solution of I-6a which was tested over the following final concentration range (w/w): 0.1%, 0.30%, 1.0%, representing a concentration range of dispersant to Catapal™ 200 of 3:1000 to 27:1000. The most effective results with I-6a were obtained at 1.0% concentration for both the T1 and T2 states.

Example 35

Control 1+Dispersant of the Invention I-6b

An aqueous dispersion of Catapal™ 200 was made with an aqueous solution of I-6b which was tested over the following final concentration range (w/w): 0.1%, 0.30%, 1.0%, representing a concentration range of dispersant to Catapal™ 200 of 3:1000 to 27:1000. The most effective results with I-6b were obtained at 1.0% concentration for both the T1 and T2 states.

Example 36

Control 1+Dispersant of the Invention I-7a

An aqueous dispersion of Catapal™ 200 was made with an aqueous solution of I-7a which was tested over the following final concentration range (w/w): 0.41%, 0.80%, 1.2%, 1.6%, representing a concentration range of dispersant to Catapal™ 200 of 11:1000 to 43:1000. The most effective results with I-7a were obtained at 0.8% concentration for both the T1 and T2 states.

The presence of I-7a alleviates the rheological problems found with Control 1 following high shear conditions and has advantages over the comparative dispersants in that, following periods of high shear, it prevents the T2 system from gelling and is as effective as the best prior art dispersants in reducing the viscosity of the T1 state.

As with Examples 19, 21, 22, 27 and 28, this example together with Examples 34 and 35, provides another opportunity to compare the poly-N,N-dimethylacrylamide systems of the invention with the polyacrylamide systems of the invention, but this time with a single carboxylic acid rather than a di-carboxylic acid anchor moiety. Comparison of this example with the poly-acrylamide systems in Examples 34 and 35 suggests that the poly-N,N-dimethyl-acrylamide moiety is not as effective as the polyacrylamide moiety for reducing the viscosity of the T1 state or fluidizing the T2 state. This is the same conclusion as reached in Example 28 and hence the polyacrylamide systems of the invention are preferred over the poly-N,N-di-methylacrylamide systems.

Example 37

Control 1+Dispersant of the Invention I-8a

The objective of this example was to find out whether the number of methylene groups between the sulphur atom and carboxylic acid was critical to the efficacy of an invention dispersant with an I-6 type of structure, which possesses only 1 methylene group in this position (see Examples 34 and 35). The dispersant structure I-8a was designed to have an anchor moiety with 10 methylene groups between the sulphur atom and the carboxylic acid, so that in other respects it was structurally similar to the I-6 type of structure insofar as it contained polyacrylamide as the polymeric part of its structure.

An aqueous dispersion of Catapal™ 200 was made with an aqueous solution of I-8a which was tested over the following final concentration range (w/w): 0.1%, 0.30%, 1.0%, representing a concentration range of dispersant to Catapal™ 200 of 3:1000 to 27:1000. The most effective results with I-8a were obtained at 1.0% concentration for both the T1 and T2 states.

The similarity in results between structures I-6 and I-8 in Examples 34, 35 and this example suggest that the number of methylene groups between the sulphur atom and carboxylic acid is not critical to the efficacy of an invention dispersant with an I-6/I-8 type of structure.

Example 38

Control 1+Dispersant of the Invention I-19a

The objective of this example was to find out whether the type of acid in the anchor moiety was critical to the efficacy of an invention dispersant. Dispersant I-19a should be compared with I-6a (Example 34), which possesses a very similar size polymer moiety (36 acrylamide monomer units v. 30 acrylamide monomer units), but possesses $HO_3S$—$CH_2$— in place of HOOC— in the anchor moiety, i.e. it contains a different acidic group.

An aqueous dispersion of Catapal™ 200 was made in a similar manner to that described in Example 34, but with an aqueous solution of I-19a in place of the aqueous solution of I-6a. I-19a was tested over the following final concentration range (w/w): 0.21%, 0.40%, 0.8%, representing a concentration range of dispersant to Catapal™ 200 of 6:1000 to 22:1000. The most effective results with I-19a were obtained at 0.80% concentration for both the T1 and T2 states.

The similarity in results between structures I-19a in this example and I-6a in Example 34, insofar as both examples show a low shear viscosity for the T1 and T2 states, suggest that changing the acid type in the anchor group from a carboxylic acid to a sulfonic acid is not critical to the efficacy of an invention dispersant containing a polyacrylamide polymeric group.

Example 39

Control 1+Dispersant of the Invention I-19a+20 mM Nitric Acid

This experiment is essentially the same as that conducted in Example 38, but with the difference that this experiment was conducted at lower pH due to the presence of 20 mM nitric acid. In this experiment I-19a was tested over the following final concentration range (w/w): 0.40%, 0.8%, representing a concentration range of dispersant to Catapal™ 200 of 11:1000 to 22:1000. As with Example 38, the most effective results with I-19a were obtained at 0.80% concentration for both the T1 and T2 states.

The presence of the nitric acid produced a slight improvement in the performance of I-19a insofar as it lowered the low shear viscosity of the T1 and T2 states relative to the previous example with no nitric acid (Example 38). This result is in keeping with experiments conducted with dispersant I-1a of the invention in the absence and presence of 20 mM nitric acid (Examples 19 and 20 respectively), which also showed that the presence of nitric acid could enhance viscosity reduction in an aqueous dispersion of Catapal™ 200 containing a dispersant of the invention. Thus changing, the acid type in the anchor group from a carboxylic acid to a sulfonic acid in the presence of nitric acid is not critical to the efficacy of an invention dispersant containing a polyacrylamide polymeric group.

Example 40

Control 1+Dispersant of the Invention I-23a

Example 38 shows that changing the acid type in the anchor group from a carboxylic acid to a sulfonic acid is not critical to the efficacy of an invention dispersant with a polyacrylamide polymeric group. The objective of this example was to demonstrate whether this were still true if a suitable alternative polymeric group were substituted in place of polyacrylamide, in this case N,N-di-methylacrylamide.

An aqueous dispersion of Catapal™ 200 was made in a similar manner to that described in Example 38, but with an aqueous solution of I-23a in place of the aqueous solution of I-19a. I-23a was tested over the following final concentration range (w/w): 0.37%, 0.80%, representing a concentration range of dispersant to Catapal™ 200 of 10:1000 to 22:1000. As with dispersant I-19a in Example 38, the most effective results with I-23a were obtained at 0.80% concentration for both the T1 and T2 states.

The similarity in results between structures I-23a in this example and I-19a in Example 38, insofar as both examples show a low shear viscosity for the T1 and T2 states, suggest that changing the polymeric group from poly-acrylamide to poly-N,N-dimethylacrylamide does not greatly affect the efficacy of a dispersant of the invention when it possesses an anchor group with a sulfonic acid moiety.

Collectively, Examples 38, 39 and 40, demonstrate that the acid type of the anchor group of a dispersant of the invention is not critical to the efficacy of the dispersant.

TABLE 2

RHEOLOGICAL PROPERTIES OF EXAMPLES OF THE INVENTION

| Ex. No. | Test System + Invention Dispersant | PARAMETER 1 Minimum T1 state low shear viscosity/Pa · s (w/w % conc. disp.) | PARAMETER 2 T2 state for yield stress material, Shear stress/Pa at 1000 Pa · s viscosity (w/w % conc. disp.) | PARAMETER 3 T2 state for fluid material, viscosity/Pa · s at 0.04 Pa shear stress (w/w % conc. disp.) |
|---|---|---|---|---|
| 19 | Control 1 + I-1a | 0.60 (0.5%) | | 157 (0.3%) |
| 20 | Control 1 + I-1a + 20 mM HNO$_3$ | 0.33 (0.2%) | | 0.71 (0.2%) |
| 21 | Control 1 + I-1b | 0.45 (0.8%) | | 8.4 (0.4%) |
| 22 | Control 1 + I-1c | 0.1 (1.2%) | | 0.1 (1.2%) |
| 23 | Control 2 + I-1c | 0.2 (1.02%) | | 0.2 (0.3%) |
| 24 | Control 3 + I-1c | 0.05 (1.0%) | | 0.06 (1.0%) |
| 25 | Control 5 + I-1b | 3 (0.21%) | | 71 (0.21%) |
| 26 | Control 6 + I-1a | 0.29 (0.3%) | | 8 (0.3%) |
| 27 | Control 1 + I-2a | 0.85 (1.0%) | | 328 (1.0%) |
| 28 | Control 1 + I-2b | 2.0 (1.2%) | | 610 (1.2%) |
| 29 | Control 1 + I-3a | 0.45 (1.0%) | | 265 (1.0%) |
| 30 | Control 1 + I-4a | 2.45 (1.0%) | | 2.5 (1.0%) |
| 31 | Control 1 + I-4b | 2.6 (1.0%) | | 2.3 (1.0%) |
| 32 | Control 1 + I-5a | 3.3 (1.0%) | | 3.2 (1.0%) |
| 33 | Control 1 + I-5b | 0.77 (0.3%) | | 0.69 (0.3%) |
| 34 | Control 1 + I-6a | 0.45 (1.0%) | | 0.71 (1.0%) |
| 35 | Control 1 + I-6b | 0.28 (1.0%) | | 0.27 (1.0%) |
| 36 | Control 1 + I-7a | 7.0 (0.8%) | | 620 (0.8%) |
| 37 | Control 1 + I-8a | 0.56 (1.0%) | | 0.55 (1.0%) |
| 38 | Control 1 + I-19a | 0.66 (0.8%) | | 1.3 (0.8%) |
| 39 | Control 1 + I-19a + 20 mM HNO3 | 0.12 (0.8%) | | 0.11 (0.8%) |
| 40 | Control 1 + I-23a | 0.20 (0.8%) | | 0.35 (0.8%) |

Example 41

Coatings of the Control 1 System in Example 1 to Fabricate Inkjet Media

The formulation used in Example 1 represents a useful system for fabricating coated inkjet media for inkjet printing insofar as the dry-coated system is both porous and glossy. In this example the gloss and porosity of this control formulation were measured so that they could be compared in Example 42 with a formulation including a dispersant of the invention.

The formulation used in Control 1 was coated onto 7 mil gelatin-subbed Estar™ (~100 µm thick) using an RK Print Motorised K Control Blade Coater (manufactured by R K Print Coat Instruments Ltd). Coatings were made using a coating speed of 1.6 cm·s$^{-1}$ (speed setting 3) and a blade height of 150 µm (set with a feeler gauge before each coating). The temperature of the coating block was controlled by re-circulating water maintained at 40±0.1 C, giving a block surface temperature of 39.0±0.5 C. The coating quality was improved by fan-assisted drying using a standard, static, desktop fan set 50 cm away from the coating block at the same height as the block. Once dry, the gloss and porosity of the coating were measured.

Gloss Measurements

The gloss was measured using a hand-held Sheen 160 gloss meter, which measures the fraction of white light reflected at various angles, which are expressed as a percentage. The measurements were made by placing the coating on a piece of plain white paper and performing repeat measurements over the entire area of good quality coating, from which the mean and standard deviation were calculated. The gloss at 60° was selected to characterise the glossiness of the coated surface.

Porosity Measurements

Once the gloss had been measured, up to six circular punches of 1" diameter (an area of A=7.55 cm$^2$) were taken from across the sample. The mass of each disc was measured on a five-figure balance and the thickness of each disc was measured using a hand-held micrometer. The mass, $m_c$, and thickness, $t_c$, of the porous coating were calculated by subtraction of the previously measured mass and thickness of the Estar™ support. The density of the coating, $\rho_c$, is then given by:

$$\rho_c = \frac{m_c}{t_c \cdot A}$$

The mean value for the coating density was calculated. To calculate porosity, the density of the coating dispersion (excluding the water), $\rho_d$, must be calculated from the known composition and the densities of the Catapal 200 (3.05 g·cm$^{-3}$) and the PVA (1.26 g·cm$^{-3}$). The porosity, P, is then given in fractionated terms by:

$$P = 1 - \frac{\rho_c}{\rho_d}$$

Results

The measurements of gloss and porosity are given in Table 3 below:

TABLE 3

| Coating | Gloss at 60° % | Porosity |
| --- | --- | --- |
| Coating 1 | 54.5 ± 2.6 | 0.585 ± 0.050 |
| Coating 2 | 59.2 ± 0.8 | 0.575 ± 0.059 |
| Coating 3 | 56.7 ± 0.4 | 0.568 ± 0.028 |
| Mean values | 56.8 | 0.576 |

Example 42

Coatings: Control 1+Dispersant of the Invention I-1a to Fabricate Inkjet Media

Aqueous dispersions of Catapal™ 200 were made up as in Example 19 such that the final general composition on a w/w basis was 36.9% Catapal™ 200, 1.1% Gohsenol™ GH-17 and 62% of a dilute aqueous solution of I-1a. Three formulations were made up such that the dispersant concentration was varied over the following concentration range (w/w): 0.30%, 0.50%, and 0.60%, representing a concentration range of dispersant to Catapal™ 200 of 8:1000 to 16:1000.

Figure 3:
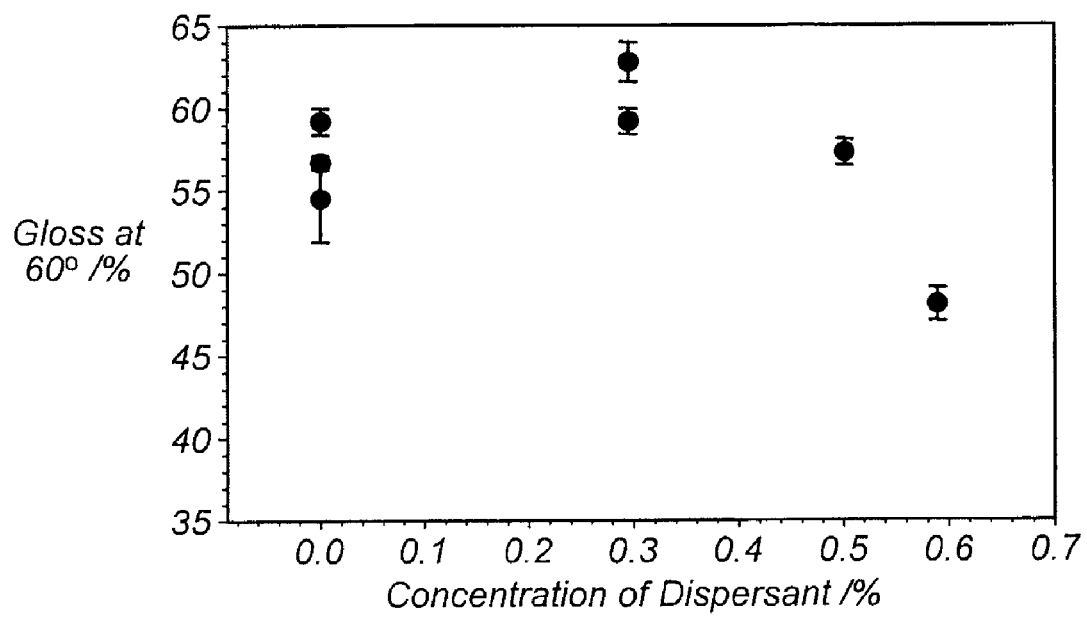

The three systems were then coated and dried in the same manner as the Control 1 system in Example 41 and once dry, the gloss and porosity of the coatings were measured in the same way. The results for gloss are presented together with those from the Control 1 system in Example 41, in FIG. 3, which demonstrates that the gloss is essentially invariant with the level of the dispersant of the invention (I-1a) up to 0.5% concentration.

Figure 4:
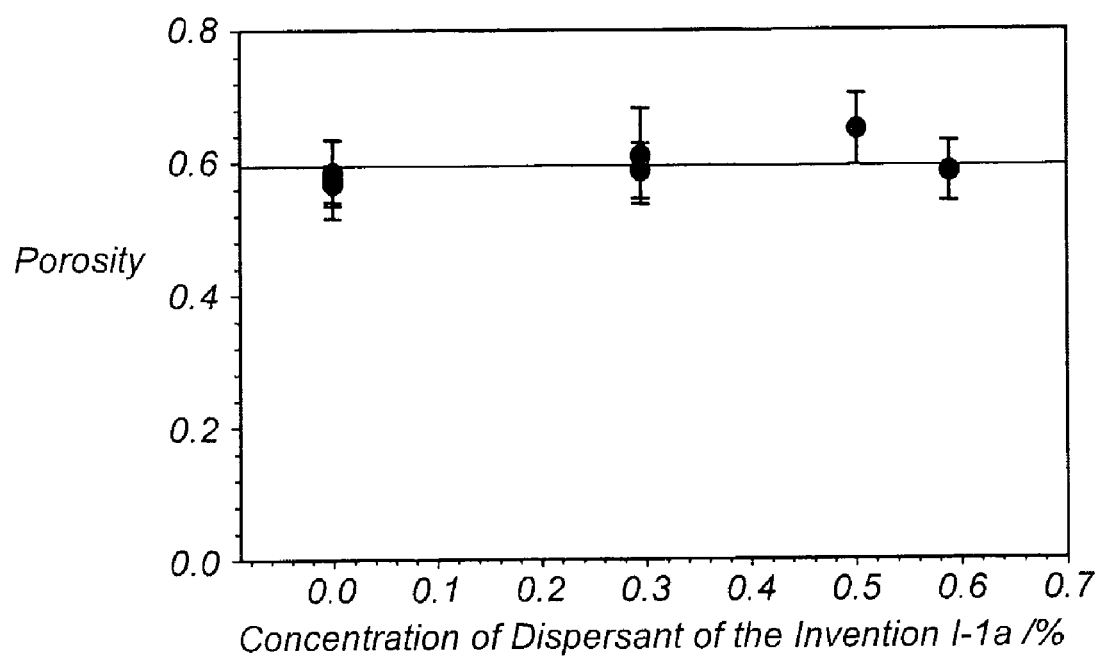

The results for porosity are presented, together with those from the Control 1 system in FIG. 4, which demonstrates that the porosity of the coatings is essentially invariant with the level of the dispersant of the invention (I-1a) up to 0.6% concentration.

The above two experiments show that when a preferred dispersant of the invention is used at its optimum concentration in the Control 1 formulation, the dispersant does not adversely affect the gloss or porosity of the resulting coated system after drying. Given that the Control 1 system is a useful formulation for creating a suitable inkjet media element for inkjet printing that provides both gloss and porosity, this means that the dispersant of the invention can be added to the formulation to provide additional benefits, without adversely affecting its suitability as an inkjet media element.

Example 43

Coatings: Catapal 200/PVA Dispersion in Water with and without Dispersant of the Invention I-3b
Composition with No Dispersant 5.92 g Catapal™ 200 were weighed out into a glass vial. Thereafter the following components were added: 2.024 g of an aqueous PVA solution containing 12.43% w/w Gohsenol™ GH23 (active wt. GH23=0.252 g); 0.063 g of an aqueous solution containing 40 wt % glyoxal (hardener) and 7.99 g of water. The resulting dispersion was stirred by hand with a spatula. The final composition on a w/w basis was: 37.0% Catapal™ 200, 1.6% Gohsenol™ GH-23, 0.16% glyoxal and 61.3% water.

Composition with Dispersant of the Invention I-3b:

5.92 g Catapal 200™ were weighed out into a glass vial. Thereafter the following components were added: 2.025 g of an aqueous PVA solution containing 12.43% w/w Gohsenol™ GH23 (active wt. GH23=0.252 g); 5.12 g of an aqueous solution containing 5.0 wt % of the dispersant of the invention I-3b (active wt. I-3b=0.2560 g); 0.074 g of an aqueous solution containing 40 wt % glyoxal (hardener) and 2.873 g of water. The resulting dispersion was stirred by hand with a spatula. The final composition on a w/w basis was: 37.0% Catapal™ 200, 1.6% Gohsenol™ GH-23, 1.6% I-3b, 0.18% glyoxal and 59.6% water.

Each of the above compositions was coated several times, each in exactly the same manner and under the same conditions as the coating operation described in Example 41. The dry coatings were then examined visually using reflected light. It was observed that all the control coatings cases, with no dispersant, contained multiple coating lines, which were presumed to be due to "clunkers" i.e. larger particles of poorly dispersed Catapal™ 200. In strong contrast thereto, all formulations made using the dispersant I-3b gave very uniform coatings without lines.

Figure 5A:
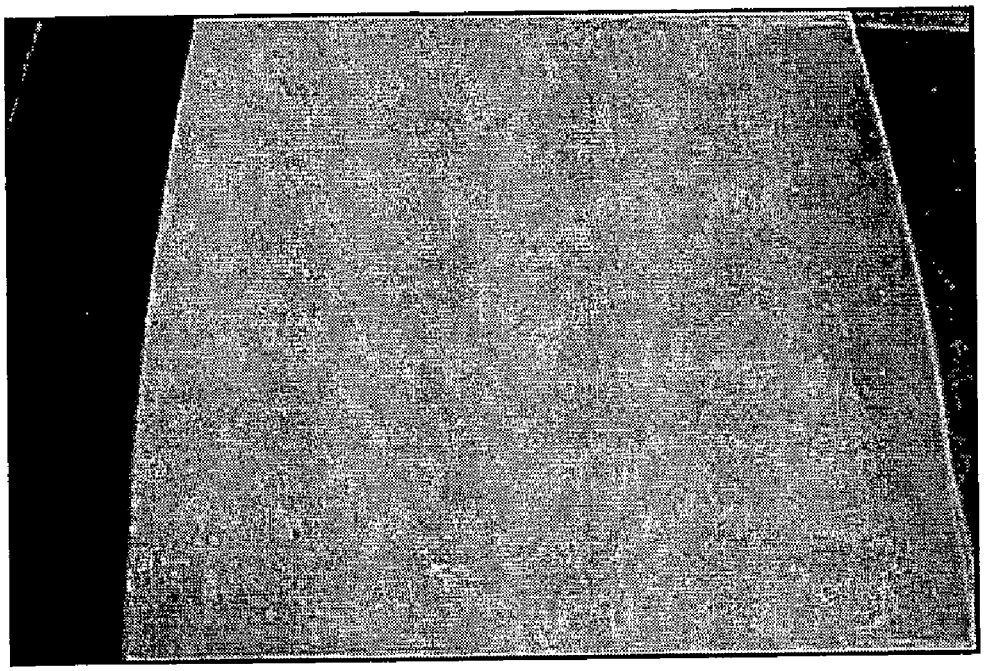
FIGS. 5a and 5b show the relative uniformity of two coating compositions based on a boehmite (Catapal™ 200) and a commercial polyvinylalcohol binder (Gohsenol™ GH23), respectively without and with a dispersant of the invention 1-3b.
Figure 5B:
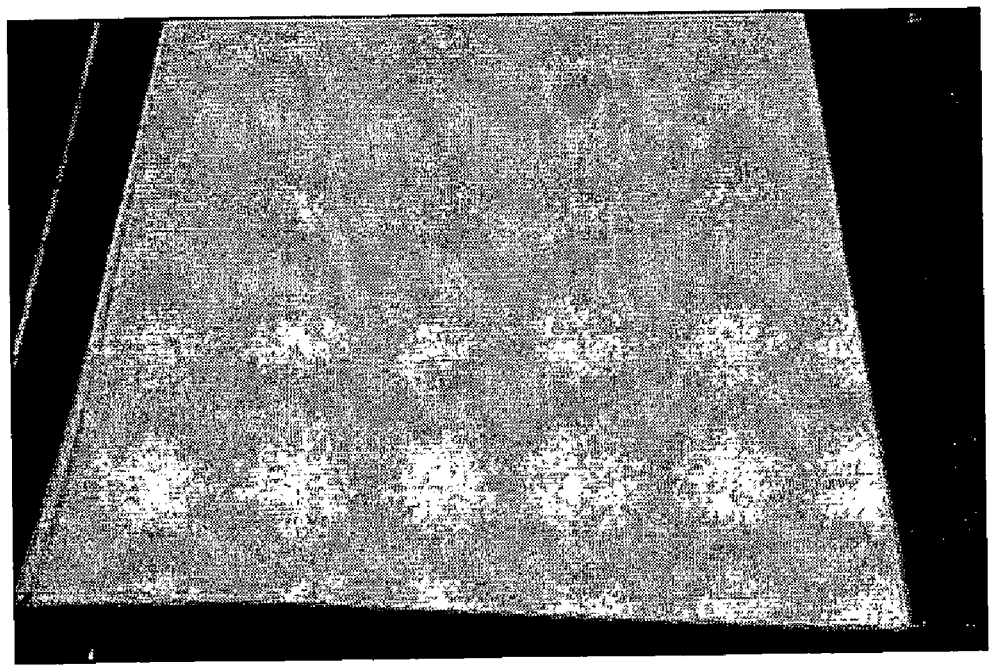

This difference is illustrated photographically in FIGS. 5a and 5b using two representative coatings from the above study, one without a dispersant and the other with dispersant of the invention I-3b. These photographs were obtained by illuminating the coatings from the side in a darkroom using a horizontally mounted Beck microscope lamp positioned about 1 metre away. The coatings were tipped about 12° from the horizontal towards the lamp to help the illumination of surface imperfections.

Thus the coating quality can be improved when a dispersant of the invention is used to disperse the Catapal™ 200 media, as in FIG. 5b, compared to the case when no dispersant is present, as in FIG. 5a. Thus, in addition to the rheological benefits, the dispersing capability of a dispersant of the invention is demonstrated, indicating that a dispersant of the invention produces a much finer dispersion of Catapal™ 200 than water alone.

Moreover by the use of these dispersants, the formulations can be processed under high shear conditions and then transported through pipe-work, de-aerators, filters and coating machinery in general, without the viscosity of the formulation rising to unacceptable levels or gelation of the formulation without such a dispersant. Hence the use of a dispersant of the invention enables the processing and the transport of the formulation throughout the coating process and in this particular case the coating of an inkjet media element.

Owing to the effectiveness of these dispersants, the invention provides a method of increasing the concentration of solids in the aqueous dispersion without increasing the viscosity or tendency to form a gel or a yield stress material, relative to either a dispersion without the dispersant or with a prior art dispersant. Furthermore the invention provides a method of controlling the yield stress of the gel in the aqueous dispersion by controlling the amount of added dispersant and added solids, such that the solids loading is higher than that obtainable using prior art dispersants.

The invention claimed is:

1. A coating composition containing boehmite particles, the composition comprising one or more dispersants in association with an aqueous dispersing medium, wherein said dispersant comprises a compound having an anchoring moiety linked to a polymeric hydrophilic moiety, said anchoring moiety containing at least one acid and/or hydroxy group and having an overall acidity or neutrality and said polymeric moiety having a lower affinity for a boehmite surface than said anchoring moiety and wherein said boehmite particles have a crystallite particle size in the range 8-80 nm, wherein said polymeric hydrophilic moiety is selected from the group consisting of polyacrylamide, poly-N,N-di-methylacrylamide, poly-2-acryl-amido-2-hydroxy-methyl-1,3-propandiol, poly-methacrylamide, poly-N-methylacrylamide, poly-N-methyl-methacrylamide, and mixtures thereof.

2. A composition as claimed in claim 1 wherein each acid group is independently selected from the group consisting of a carboxylic acid, sulfonic acid and phosphoric acid.

3. A coating composition containing boehmite particles, the composition comprising one or more dispersants in association with an aqueous dispersing medium, wherein said dispersant comprises a compound having an anchoring moiety linked to a polymeric hydrophilic moiety, said anchoring moiety containing at least one acid and/or hydroxy group and having an overall acidity or neutrality and said polymeric moiety having a lower affinity for a boehmite surface than said anchoring moiety and wherein said boehmite particles have a crystallite particle size in the range 8-80 nm, wherein said compound has the formula (I):—

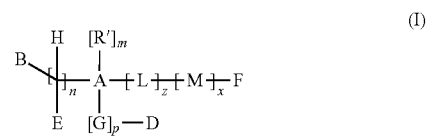

wherein
A is carbon or nitrogen,
R' is hydrogen or an alkyl, aryl or heterocyclic group and m is 1 when A is carbon and m is 0 when A is nitrogen;
B is an acid group or an ester or amide thereof, or a hydroxy group;
each E is independently hydrogen, an amino group, or an acid group or an ester or amide of an acid group, and n is 0 or an integer from 1 to 10;
D is a hydrogen atom, an amino group, an acid group or an ester or amide of an acid group, an alkyl group, or an alkyl group substituted with one or more acid groups or an ester or amide of an acid group;
G is a carbonyl group or an alkylene, aminoalkylene or oxyalkylene group and p is 0 or 1;
L is a linking group and z is 0 or 1;
D and L or D, G and L may combine with A to form 5-, 6- or 7-membered ring which may include one or more further heteroatoms selected from the group consisting of nitrogen, oxygen and sulfur;
each M is a monomer unit, which may be the same or different, comprising an acrylamide or methacrylamide, and x is 5-200; and
F is hydrogen or a substituent selected from the group consisting of a halogen atom, an alkyl group, a thiol, a neutral thioether, an ether, an ester, an alkyl-sulfonate and an aryl-sulfonate group;
with the proviso that (a) the number of acid groups is equal to or greater than the number of amino groups therein and (b) there is at least one hydroxy or acid group.

4. A composition as claimed in claim 3 wherein A is carbon and R' is hydrogen or a methyl group.

5. A composition as claimed in claim 3 wherein any acid group as or forming part of B, E, D or G is independently selected from the group consisting of a carboxylic acid, sulfonic acid and phosphoric acid.

6. A composition as claimed in claim 3 wherein z is 1 and L is sulfur.

7. A composition as claimed in claim 3 wherein x is 10-50.

8. A composition as claimed in claim 3 wherein monomer unit M is acrylamide or N,N-dimethylacryl-amide or a mixture thereof.

9. A composition as claimed in claim 3 wherein the compound has the structure

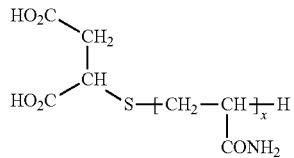

wherein x is from 10 to 50.

10. A composition as claimed in claim 3 wherein the ratio of said dispersant to boehmite particles is 5:1000 to 25:1000 w/w.

11. A method of coating a substrate comprising the steps of
 (a) providing a composition of boehmite particles;
 (b) combining said composition with one or more dispersants in association with an aqueous dispersing medium, and optionally a binder, to form a coating composition according to claim 3,
 (c) applying said coating composition to said substrate to form a coating thereon and
 (d) drying said resultant coating.

12. A coating composition containing boehmite particles, the composition comprising one or more dispersants in association with an aqueous dispersing medium, wherein said dispersant comprises a compound having an anchoring moiety linked to a polymeric hydrophilic moiety, said anchoring moiety containing at least one acid and/or hydroxy group and having an overall acidity or neutrality and said polymeric moiety having a lower affinity for a boehmite surface than said anchoring moiety and wherein said boehmite particles have a crystallite particle size in the range 8-80 nm, wherein the boehmite content in the composition is 30-45 wt %.

13. A coating composition containing boehmite particles, the composition comprising one or more dispersants in association with an aqueous dispersing medium, wherein said dispersant comprises a compound having an anchoring moiety linked to a polymeric hydrophilic moiety, said anchoring moiety containing at least one acid and/or hydroxy group and having an overall acidity or neutrality and said polymeric moiety having a lower affinity for a boehmite surface than said anchoring moiety and wherein said boehmite particles have a crystallite particle size in the range 20-60 nm.

14. A composition as claimed in claim 13 wherein said boehmite particles have a crystallite particle size in the range 30-50 nm.

* * * * *